(12) United States Patent
Kim et al.

(10) Patent No.: US 10,579,109 B2
(45) Date of Patent: Mar. 3, 2020

(54) CONTROL DEVICE AND CONTROL METHOD

(71) Applicant: SONY CORPORATION, Tokyo (JP)

(72) Inventors: Heesoon Kim, Kanagawa (JP); Shunichi Kasahara, Kanagawa (JP); Masahiko Inami, Kanagawa (JP); Kouta Minamizawa, Tokyo (JP); Yuta Sugiura, Tokyo (JP); Yusuke Mizushina, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/510,557

(22) PCT Filed: Jun. 15, 2015

(86) PCT No.: PCT/JP2015/067152
§ 371 (c)(1),
(2) Date: Mar. 10, 2017

(87) PCT Pub. No.: WO2016/042862
PCT Pub. Date: Mar. 24, 2016

(65) Prior Publication Data
US 2017/0285694 A1    Oct. 5, 2017

(30) Foreign Application Priority Data
Sep. 19, 2014 (JP) ................................. 2014-192006

(51) Int. Cl.
*G06F 1/16*    (2006.01)
*G06F 3/01*    (2006.01)
(Continued)

(52) U.S. Cl.
CPC ............ *G06F 1/1694* (2013.01); *G06F 1/163* (2013.01); *G06F 1/1637* (2013.01); *G06F 3/011* (2013.01);
(Continued)

(58) Field of Classification Search
CPC ...... G06F 1/1694; G06F 1/163; G06F 1/1637; G06F 3/011; G06F 3/012; G06F 1/1686
See application file for complete search history.

(56) References Cited

U.S. PATENT DOCUMENTS

| 2002/0105482 A1* | 8/2002 | Lemelson ............... G06F 3/013 345/7 |
| 2006/0273984 A1* | 12/2006 | Wanda ................... G06F 3/011 345/7 |

(Continued)

FOREIGN PATENT DOCUMENTS

| JP | 06-289773 A | 10/1994 |
| JP | 08-117440 A | 5/1996 |

(Continued)

OTHER PUBLICATIONS

S. Tachi, et al. "Telexistence cockpit for humanoid robot control", Advanced Robotics, vol. 17, No. 3, Sep. 2003, pp. 199-217 (Year: 2003).*

*Primary Examiner* — Stephen G Sherman
(74) *Attorney, Agent, or Firm* — Chip Law Group

(57) ABSTRACT

To provide a control device and a control method capable of controlling display like a case in which a user performs his or her head movement although the user does not move his or her head. There is provided a control device including: an acquisition unit configured to acquire position attitude information regarding a position or an attitude of an object related to a user manipulation located at a different position from a head of a user; and a control unit configured to control an image visual field which is a range displayed as an image on a display device mounted on the head of the user based on the position attitude information.

16 Claims, 17 Drawing Sheets

(51) Int. Cl.
*G06F 3/0481* (2013.01)
*G06F 3/0484* (2013.01)

(52) U.S. Cl.
CPC .............. *G06F 3/012* (2013.01); *G06F 3/017* (2013.01); *G06F 3/04815* (2013.01); *G06F 3/04845* (2013.01); *G06F 1/1686* (2013.01)

(56) References Cited

U.S. PATENT DOCUMENTS

| | | | | |
|---|---|---|---|---|
| 2007/0024610 A1* | 2/2007 | Katano | .................. | G06T 17/00 345/418 |
| 2008/0106488 A1* | 5/2008 | Okuno | .................. | A63F 13/06 345/8 |
| 2013/0278497 A1* | 10/2013 | Takagi | .................. | G06F 3/012 345/156 |
| 2014/0168261 A1* | 6/2014 | Margolis | ................ | G06F 3/011 345/633 |
| 2014/0268356 A1 | 9/2014 | Bolas et al. | | |

FOREIGN PATENT DOCUMENTS

| | | | |
|---|---|---|---|
| JP | 2004-258123 A | 9/2004 | |
| JP | 2013-258614 A | 12/2013 | |
| WO | 2007/116743 A1 | 10/2007 | |

* cited by examiner

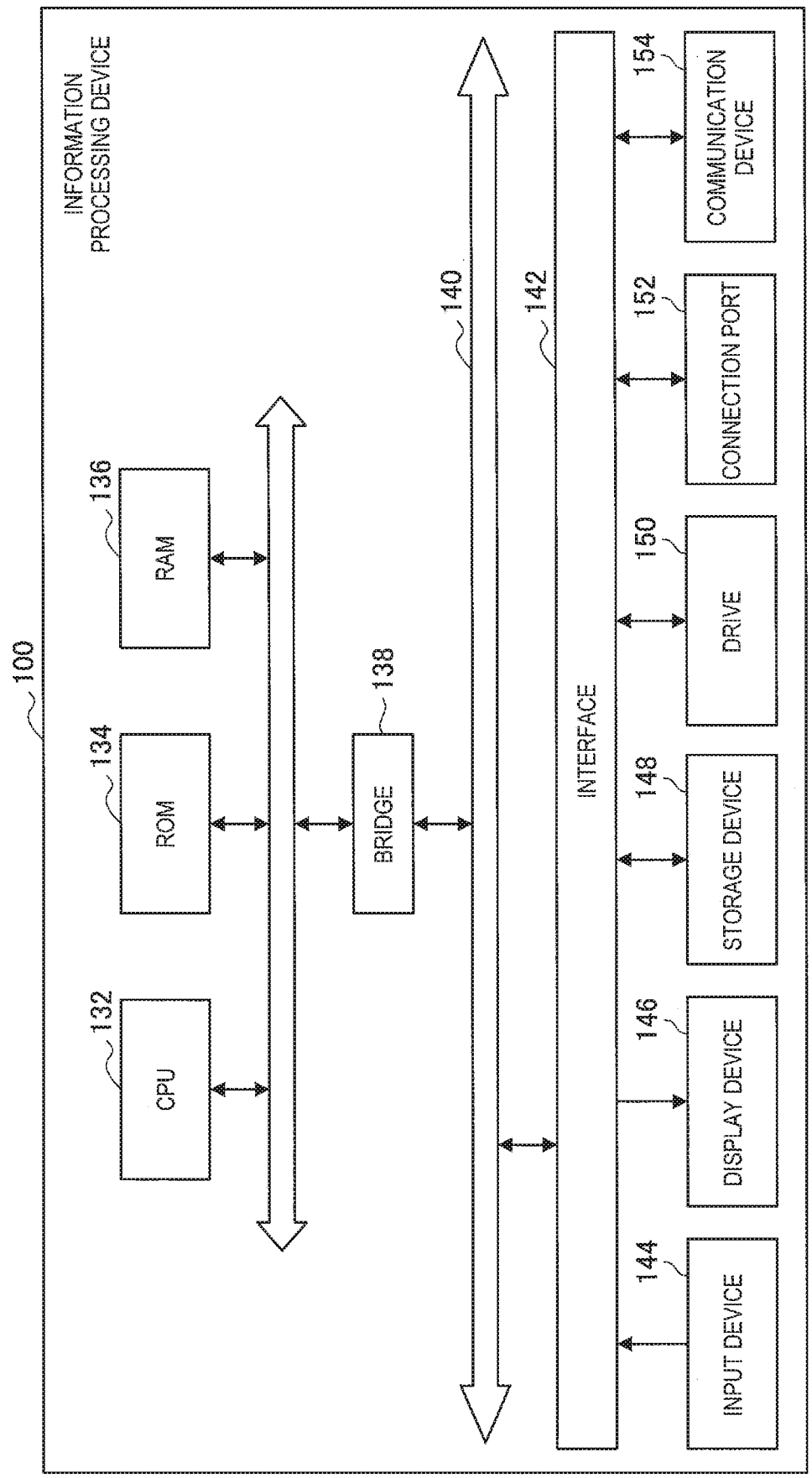

CONTROL DEVICE AND CONTROL METHOD

CROSS REFERENCE TO RELATED APPLICATIONS

This application is a U.S. National Phase of International Patent Application No. PCT/JP2015/067152 filed on Jun. 15, 2015, which claims priority benefit of Japanese Patent Application No. JP 2014-192006 filed in the Japan Patent Office on Sep. 19, 2014. Each of the above-referenced application is hereby incorporated herein by reference in its entirety.

TECHNICAL FIELD

The present disclosure relates to a control device, a control method, and a program.

BACKGROUND ART

In recent years, with reductions in the weights and sizes of display devices, display devices mounted on heads, such as head mount displays (HMDs) have been developed. Further, to improve a sense of immersion in videos displayed on HMDs, technologies for causing HMDs to display images according to head movements of users have been developed.

For example, Patent Literature 1 discloses a display control technology for changing a visual line direction of a panorama image displayed on an HMD according to rotation of a head ascertained from an attitude sensor or the like included in the HMD.

CITATION LIST

Patent Literature

Patent Literature 1: JP 2013-258614A

DISCLOSURE OF INVENTION

Technical Problem

In the technology disclosed in Patent Literature 1, however, when a user moves his or her head, display of a display device such as an HMD is changed. Therefore, a burden is imposed on the user performing a manipulation.

Accordingly, the present disclosure proposes a novel and improved control device, a novel and improved control method, and a novel and improved program capable of controlling display like a case in which a user performs a head movement although the user does not move his or her head.

Solution to Problem

According to the present disclosure, there is provided a control device including: an acquisition unit configured to acquire position attitude information regarding a position or an attitude of an object related to a user manipulation located at a different position from a head of a user; and a control unit configured to control an image visual field which is a range displayed as an image on a display device mounted on the head of the user based on the position attitude information.

According to the present disclosure, there is provided a control method including: acquiring position attitude information regarding a position or an attitude of an object related to a user manipulation located at a different position from a head of a user; and controlling an image visual field which is a range displayed as an image on a display device mounted on the head of the user based on the position attitude information.

According to the present disclosure, there is provided a program causing a computer to realize: an acquisition function of acquiring position attitude information regarding a position or an attitude of an object related to a user manipulation located at a different position from a head of a user; and a control function of controlling an image visual field which is a range displayed as an image on a display device mounted on the head of the user based on the position attitude information.

Advantageous Effects of Invention

The present disclosure described above provides a control device, a control method, and a program capable of controlling display like a case in which a user performs his or her head movement although the user does not move his or her head.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 16 is a diagram for describing the hardware configuration of a control device according to an embodiment of the present disclosure.

MODE(S) FOR CARRYING OUT THE INVENTION

Figure 1:
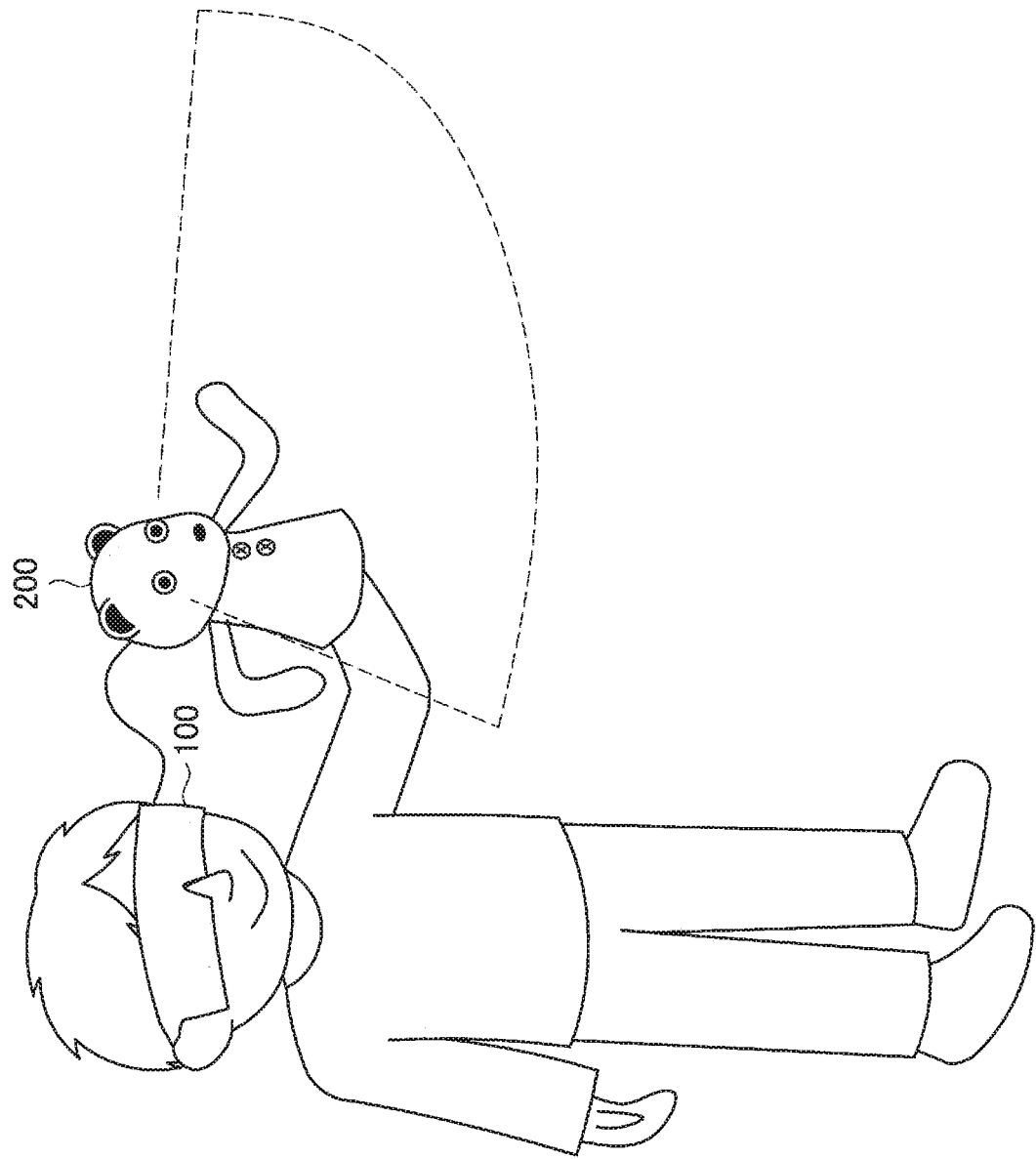
FIG. 1 is a diagram for describing an overview of a control device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Moreover, the description will be made in the following order.
1. Overview of control device according to embodiment of present disclosure
2. First embodiment (example in which image visual field is controlled based on position attitude of manipulation object)
2-1. Configuration of control device
2-2. Process of control device
2-3. Modification examples
3. Second embodiment (example in which image visual field is controlled based on position attitude of operation device)
3-1. Configuration of control device
3-2. Process of control device
3-3. Modification example
4. Third embodiment (example of display using image visual field of manipulation object)
4-1. Configuration of control device
4-2. Process of control device
4-3. Modification example
5. Hardware configuration of control device according to embodiment of present disclosure
6. Conclusion <1. Overview of Control Device According to Embodiment of Present Disclosure>

First, an overview of a control device according to an embodiment of the present disclosure will be described with reference to FIG. 1. FIG. 1 is a diagram for describing an overview of the control device according to the embodiment of the present disclosure.

A control device 100 according to the embodiment of the present disclosure is a portable device that is mounted on the head of a user and includes a display unit covering a part or all of a visual field of the user. Further, the control device 100 has a communication function and a display control function. The communication function receives information from an external device or transmits information to an external device. The display control function is a function of performing control related to display such that a display displays an image. Therefore, the control device 100 can receive an image from an external device and causes the display to display the received image.

For example, as illustrated in FIG. 1, the control device 100 can be a glasses type HMD that is mounted on the head of the user. The control device 100 receives an image from an external device and causes the display unit to display the received image.

Here, to improve a sense of immersion in an image displayed on the HMD, it is generally known that an image according to a head movement of the user is displayed by the HMD. In this case, however, when the user moves his or her head, display of the HMD is changed. Therefore, a burden is imposed on the user performing a manipulation. Further, since a display range of the HMD stays within a range in which the user can perform a head movement, it is difficult to display a dynamic viewpoint change exceeding the movable range of the head. Accordingly, the control device 100 according to an embodiment of the present disclosure receives information regarding a position or an attitude or both the position and the attitude (hereinafter also referred to as a position attitude) of the manipulation object (hereinafter also referred to as position attitude information) located at a different position from the head of the user and controls a range displayed as an image (hereinafter also referred to as an image visual field) on a display device mounted on the head of the user based on position attitude information.

For example, as illustrated in FIG. 1, the control device 100 can be connected to be able to communicate with a doll-like manipulation object 200 which can be manipulated by the user. The control device 100 receives position attitude information indicating the position attitude of the manipulation object 200 detected in the manipulation object 200 from the manipulation object 200. Next, based on the received position attitude information, the control device 100 decides an image visual field, for example, an angle of view, in which a predetermined position of the manipulation object 200, for example, the position of the face of the manipulation object 200, is a visual line source. Then, the control device 100 generates an image based on the decided angle of view and causes the display unit to display the generated image.

In this way, the control device 100 according to the embodiment of the present disclosure receives the position attitude information regarding the manipulation object or the like located at a different position from the head of the user and controls a range displayed as an image on the display device mounted on the head of the user based on the position attitude information. Therefore, by displaying the image according to the position attitude of the manipulation object or the like manipulated by the user, it is possible to control a range which is a display target of the display device according to an intention of the user although the user does not move his or her head. Moreover, in FIG. 1, the glasses type HMD is illustrated as an example of the control device 100. However, the control device 100 may be a hat type HMD or any of other types of HMDs or may be a device connected to a display device without including a display device, for example, a server. Further, to facilitate the description, control devices 100 according to first to third embodiments are distinguished from each other by suffixing numbers corresponding to the embodiments, such as control devices 100-1 and 100-2.

<2. First Embodiment (example in Which Image Visual Field is Controlled Based on Position Attitude of Manipulation Object)>

An overview of the control device 100 according to the embodiment of the present disclosure will be described. Next, the control device 100-1 according to the first embodiment of the present disclosure will be described.

In general, human beings combine a plurality of senses to perceive a virtual space. In particular, in perception of a virtual space, it is important to guarantee consistency of a sense of vision and senses of the body. When the consistency is not guaranteed, a reduction in a sense of immersion or a sense of presence in a virtual space, visually induced motion sickness, or the like may occur. On the other hand, it is generally known to provide an image according to a movement of a human head. In this case, however, since a range displayed as an image stays within a range in which the human head can be moved, it is difficult to display a dynamic viewpoint change exceeding a movable range of the head.

Accordingly, the control device 100-1 according to the first embodiment of the present disclosure controls a range displayed as an image related to a virtual space on a display unit by using a body movement of another object manipulated by a human being instead of a body movement of the human being.

<2-1. Configuration of Control Device>

Figure 2:
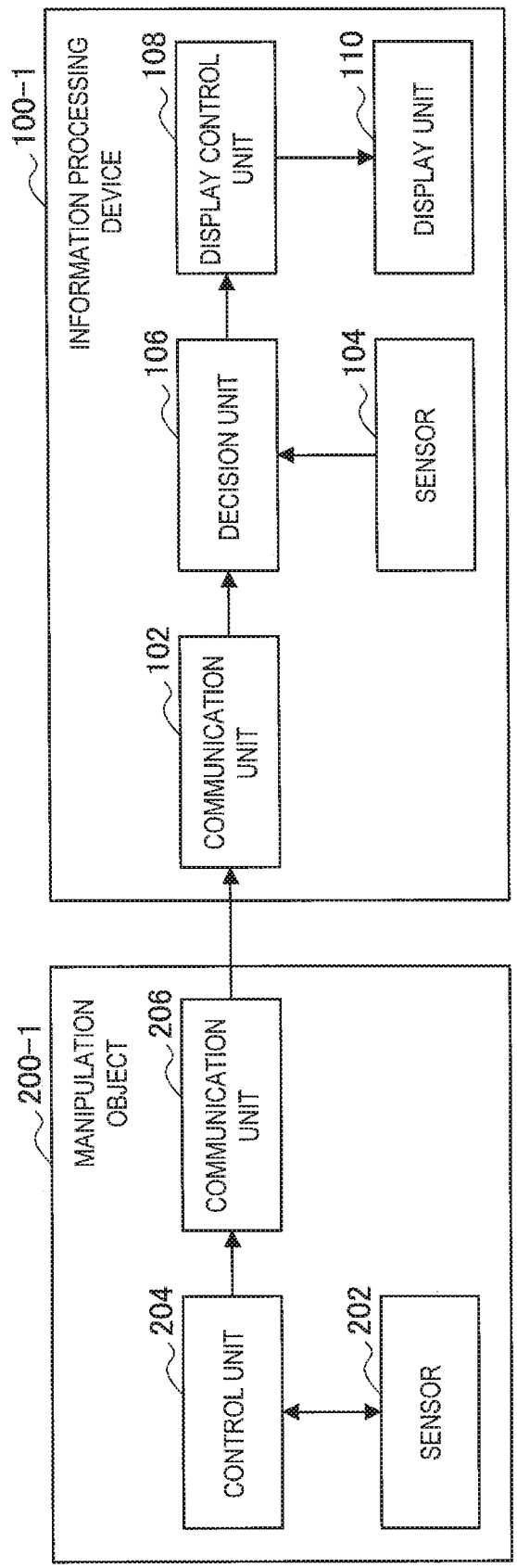
FIG. 2 is a block diagram illustrating a schematic functional configuration of a control system configured using the control device according to a first embodiment of the present disclosure.

First, the configuration of the control device 100-1 according to the first embodiment of the present disclosure will be described with reference to FIG. 2. FIG. 2 is a block diagram illustrating a schematic functional configuration of a control system configured using the control device 100-1 according to the first embodiment of the present disclosure.

As illustrated in FIG. 2, the control system is configured to include the control device 100-1 and a manipulation object 200-1.

(Functional Configuration of Manipulation Object 200-1)

The manipulation object 200-1 includes a sensor 202, a control unit 204, and a communication unit 206.

The sensor 202 detects a change in a position attitude of the manipulation object 200-1. Specifically, the sensor 202 transitions to a detection state based on an instruction from the control unit 204 and detects a change and a change amount of the position attitude of the manipulation object 200-1. For example, the sensor 202 can be an acceleration sensor, an angular velocity sensor, a geomagnetic sensor, or any of other motion sensors. Moreover, in the embodiment, the sensor 202 detects a change in the position attitude.

The control unit 204 controls all of the operations of the manipulation object 200-1. Specifically, the control unit 204 generates information indicating a change amount of a position attitude of the manipulation object 200-1 detected by the sensor 202 as position attitude information by instructing the sensor 202 to operate. Further, the control unit 204 causes the communication unit 206 to transmit the generated position attitude information.

The communication unit 206 performs communication with the control device 100-1. Specifically, the communication unit 206 transmits the position attitude information generated by the control unit 204 to the control device 100-1. For example, the communication unit 206 can perform wireless communication using WiFi (registered trademark), Bluetooth (registered trademark), Zigbee (registered trademark), or the like. Further, the communication unit 206 may perform communication via a wired line.

(Functional Configuration of Control Device 100-1)

Further, as illustrated in FIG. 2, the control device 100-1 includes a communication unit 102, a sensor 104, a decision unit 106, a display control unit 108, and a display unit 110.

The communication unit 102 serving as an acquisition unit performs communication with the manipulation object 200-1. Specifically, the communication unit 102 receives the position attitude information from the manipulation object 200-1. Moreover, FIG. 2 illustrates a diagram in which the communication unit 102 performs only reception. However, the communication unit 102 may transmit, for example, a request for transmitting the position attitude information to the manipulation object 200-1.

The sensor 104 serving as an acquisition unit detects a movement of the head of the user. Specifically, the sensor 104 detects a change and a change amount of a position attitude of the control device 100-1 mounted on the head of the user. Moreover, the sensor 104 according to the embodiment is substantially the same as the sensor 202, and thus the detailed description thereof will be omitted.

The decision unit 106 serving as a control unit decides an image visual field. Specifically, the decision unit 106 decides an image visual field in which the manipulation object 200-1 is a visual line source (hereinafter also referred to as an image visual field of the manipulation object 200-1) as a first image visual field based on the position attitude information regarding the manipulation object 200-1 received by the communication unit 102. For example, the decision unit 106 changes a direction and an amount of a previous image visual field of the manipulation object 200-1 corresponding to a change direction and a change amount of the position attitude indicated by the received position attitude information and decides a new image visual field of the manipulation object 200-1.

Further, the image visual field of the manipulation object 200-1 decided by the decision unit 106 includes at least a part of a virtual space. For example, the decision unit 106 sets an image visual field of the manipulation object 200-1 at the time of starting of an operation of the control device 100-1 (hereinafter also referred to as an initial visual field) and changes the image visual field of the manipulation object 200-1 from the initial visual field according to the change in the position attitude. Moreover, the initial visual field can be decided or changed by an application or the like that constructs a virtual space.

Moreover, the image visual field of the manipulation object 200-1 can be an image visual field in which a position decided in advance in the manipulation object 200-1 is a visual line source. For example, when the manipulation object 200-1 has a doll shape, the image visual field of the manipulation object 200-1 can be an angle of view in which a part equivalent to the face or an eye of the doll is a visual line source. However, the visual line source of the image visual field of the manipulation object 200-1 is not limited thereto. For example, the visual line source may be set or changed through a user manipulation or the like.

Further, the decision unit 106 decides an image visual field equivalent to a visual field of the user (hereinafter also referred to as an image visual field of the user) as a second image visual field based on a position attitude of the head of the user. For example, the decision unit 106 decides an image visual field of the user on which the control device 100-1 is mounted, based on a change amount of a position attitude of the control device 100-1 detected by the sensor 104, that is, the head of the user. Moreover, the decision unit 106 may decide an image visual field of the user based on the position attitude of the head of the user specified using a general head tracking technology.

Figure 3:
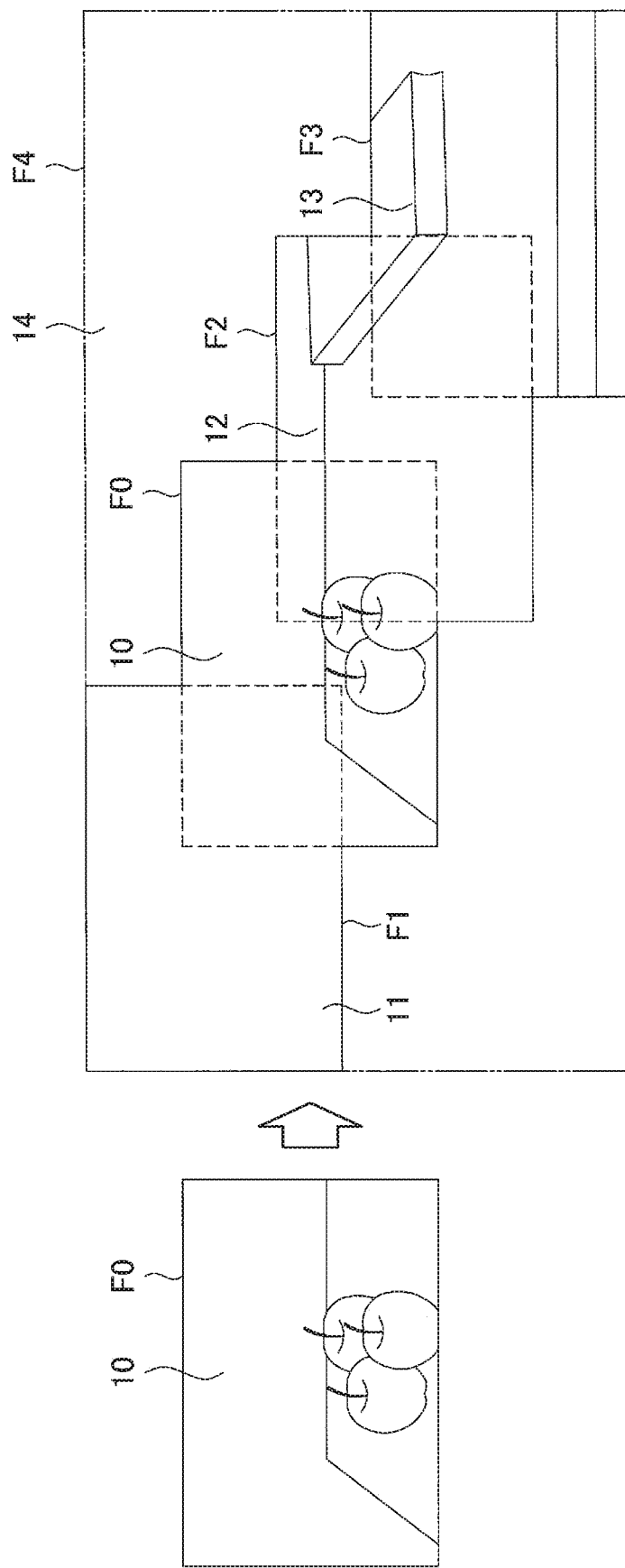
FIG. 3 is a diagram illustrating a display example of an image indicating a virtual space generated based on an image visual field decided by the control device according to the embodiment.

The display control unit 108 serving as a control unit controls display of the display unit 110. Specifically, the display control unit 108 causes the display unit 110 to display an image indicating a virtual space generated based on the image visual field of the manipulation object 200-1 decided by the decision unit 106. Furthermore, a process of the display control unit 108 will be described in detail with reference to FIG. 3. FIG. 3 is a diagram illustrating a display example of an image indicating a virtual space generated based on an image visual field decided by the control device 100-1 according to the embodiment.

First, the display control unit 108 causes the display unit 110 to display a virtual space of the initial visual field. For example, the display control unit 108 causes the display unit 110 to display an image 10 indicating a virtual space of an initial visual field F0 illustrated in the left drawing of FIG. 3. For example, the image visual field can be decided by an angle of view of a camera on the virtual space (hereinafter also referred to as a virtual camera). Moreover, the angle of view of the virtual camera deciding the initial visual field can be an angle of view in which the image visual field is narrower than a human visual field.

Next, the display control unit 108 changes display of the display unit 110 according to a change in the image visual field of the manipulation object 200-1. For example, when the image visual field of the manipulation object 200-1 decided by the decision unit 106 is changed from the initial visual field F0 to image visual fields F1, F2, and F3 in this order, as illustrated in the right drawing of FIG. 3, the display control unit 108 causes the display unit 110 to display images 11, 12, and 13 in this order. Moreover, to facilitate the description, the example in which the image visual field of the manipulation object 200-1 is decided at time intervals at which the image visual field is changed in a step form has been described. However, the decision of the image visual field of the manipulation object 200-1 and the display of the image generated based on the image visual field can be performed at time intervals at which the image visual field is changed more smoothly.

Figure 4:
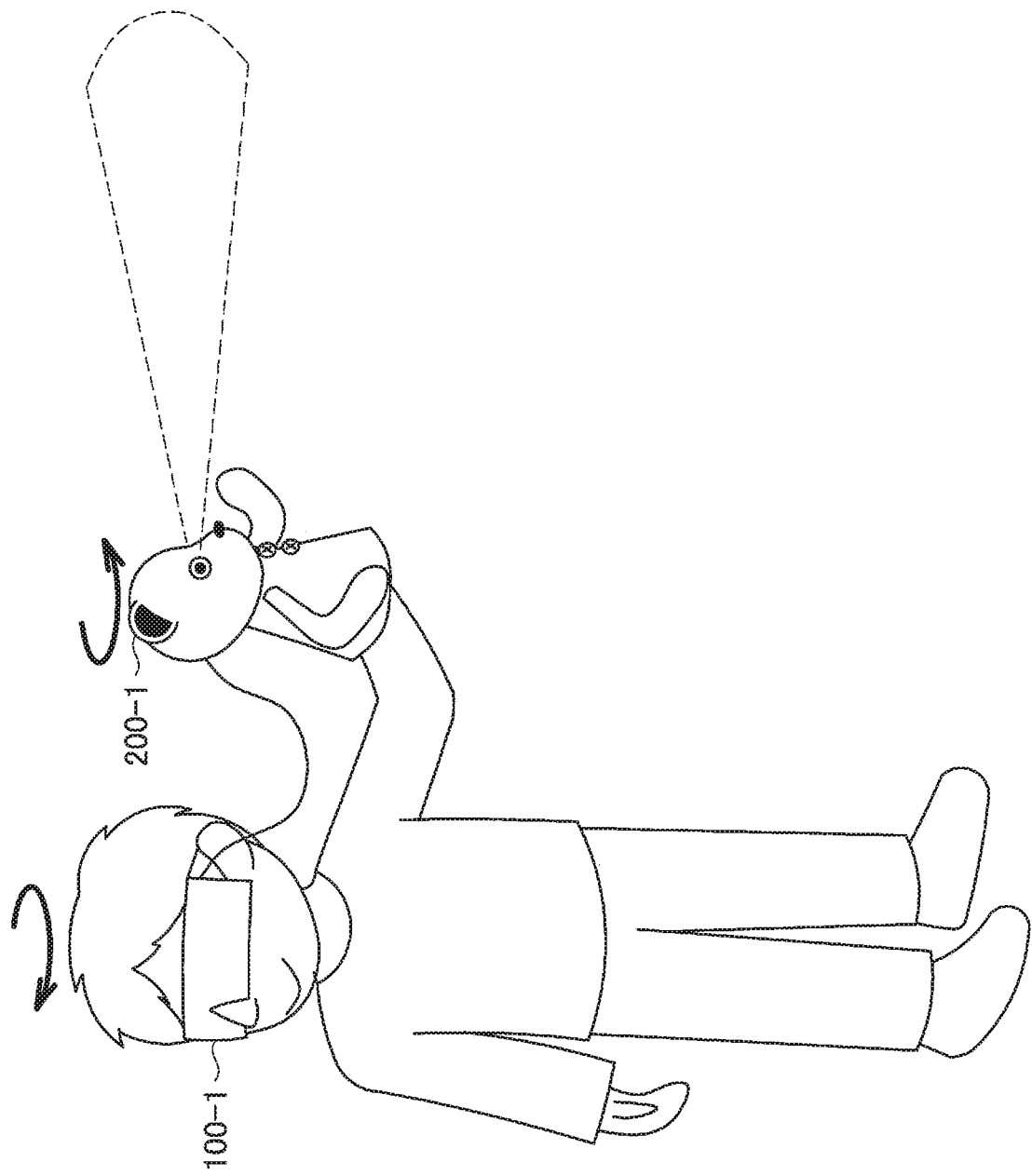
FIG. 4 is a diagram illustrating an example of a motion of the head of a user in the control device and a motion of a manipulation object according to the embodiment.

Further, the display control unit 108 selects an image visual field. Specifically, the display control unit 108 selects one of the image visual field of the manipulation object 200-1 and the image visual field of the user as a range displayed as an image based on a situation of the user. For example, the display control unit 108 selects the image visual field of the user when a predetermined user manipulation is performed. Furthermore, a process of selecting an image visual field will be described in detail with reference to FIG. 4. FIG. 4 is a diagram illustrating an example of a motion of the head of the user in the control device 100-1 and a motion of the manipulation object 200-1 according to the embodiment.

First, as described above, the display control unit 108 causes the display unit 110 to display an image indicating a virtual space generated based on an image visual field of the manipulation object 200-1. For example, the display control unit 108 causes the display unit 110 to display the image 10 indicating the virtual space of the image visual field F0 of the manipulation object 200-1 illustrated in the left drawing of FIG. 3.

Then, the display control unit 108 selects the image visual field of the user when the position attitudes of the manipulation object 200-1 and the head of the user are changed in mutually different directions. For example, when the position attitudes of the manipulation object 200-1 and the head of the user are changed, the decision unit 106 specifies change directions of the position attitudes of the manipulation object 200-1 and the head of the user. Then, when the change direction of the position attitude of the manipulation object 200-1 is different from the change direction of the position attitude of the head of the user, for example, a rotation direction of the head which is the visual line source of the image visual field of the manipulation object 200-1 is an opposite direction to a rotation direction of the head of the user, as illustrated in FIG. 4, the display control unit 108 selects the image visual field of the user as a range displayed as an image.

Next, the display control unit 108 causes the display unit 110 to display an image indicating a virtual space generated based on the selected image visual field of the user. For example, when the image visual field of the user is selected, the display control unit 108 causes the display unit 110 to display an image 14 indicating a virtual space of an image visual field F4 of the user, as illustrated in the right drawing of FIG. 3. The image visual field of the user can be widened more than the image visual field of the manipulation object 200-1. Further, the image 14 indicating the virtual space generated based on the image visual field of the user can be a combination of the images 10 to 13 indicating the virtual spaces generated based on the image visual fields of the manipulation object 200-1, that is, a range of the displayed virtual spaces, as illustrated in the right drawing of FIG. 3. Moreover, the image indicating the virtual space generated based on the image visual field of the user may be an image indicating all of the virtual spaces of the image visual fields or may be an image indicating some of all the virtual spaces equivalent to the previously displayed image visual field.

Moreover, the example in which the predetermined user manipulation is a manipulation of changing the position attitude of the manipulation object 200-1 and the position attitude of the head of the user in different directions has been described. However, the predetermined user manipulation may be an explicit image visual field switching manipulation by the user. For example, the display control unit 108 selects an image visual field of the user when a gesture indicating switch of the image visual field is performed or a manipulation on a manipulation unit separately included in the control device 100-1, for example, a press of a predetermined button, is performed. Further, the image visual field of the user may separately be switched to the image visual field of the manipulation object 200-1.

Further, the predetermined user manipulation may be a change in the manipulation object 200-1. For example, when the manipulation object 200-1 is changed to another manipulation object 200-1, the display control unit 108 switches one of the image visual field of the manipulation object 200-1 and the image visual field of the user according to a kind of manipulation object 200-1.

Here, referring back to FIG. 2, the configuration of the control device 100-1 will be described. The display unit 110 performs display based on an instruction from the display control unit 108. Specifically, an image indicating a virtual space generated based on an image visual field selected by the display control unit 108 is displayed. For example, the display unit 110 can be a display such as a liquid crystal display or an electro-luminescence (EL) display.

<2-2. Process of Control Device>

Figure 5:
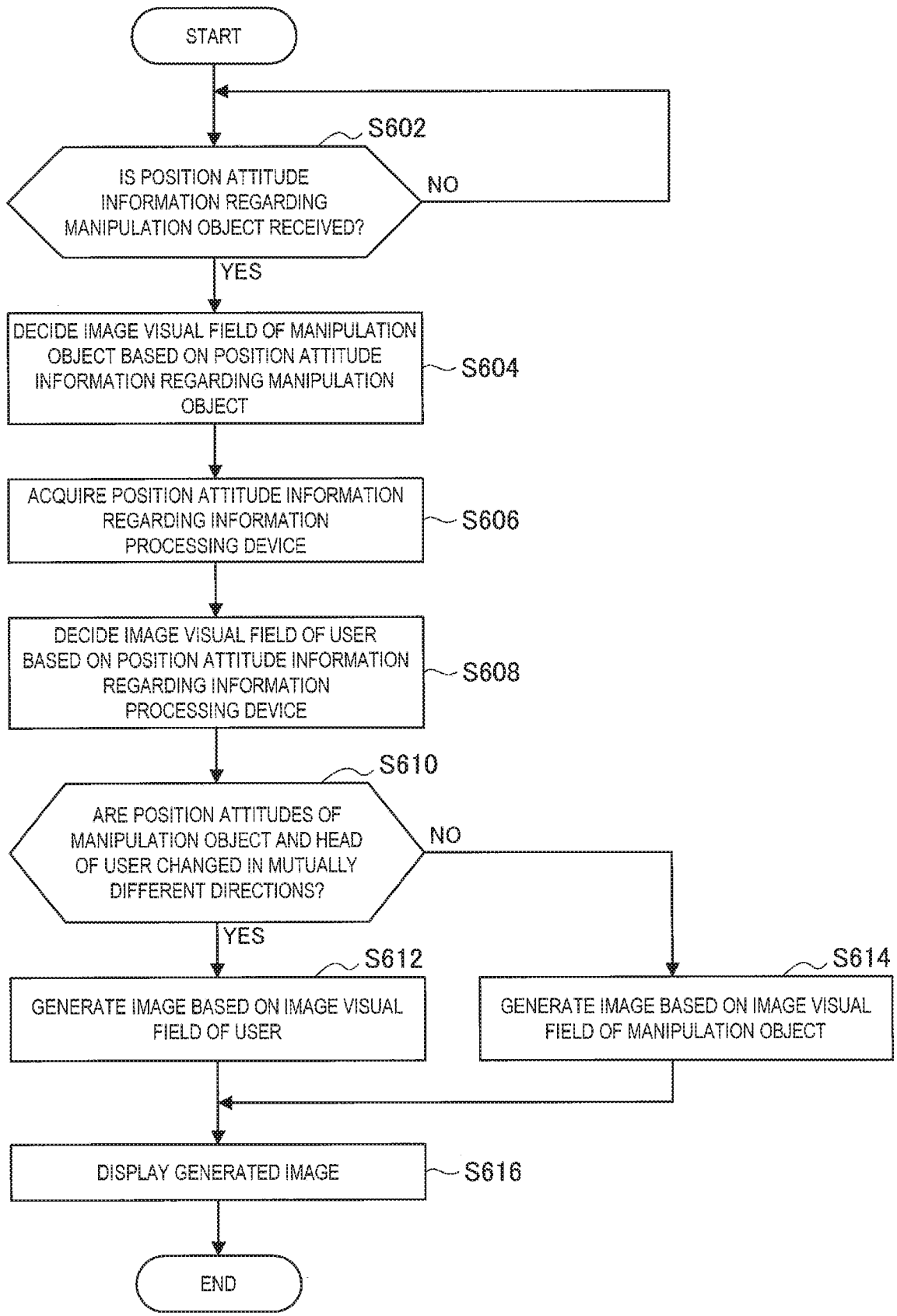
FIG. 5 is a flowchart conceptually illustrating a process of the control device according to the embodiment.

Next, a process of the control device 100-1 according to the embodiment will be described with reference to FIG. 5. FIG. 5 is a flowchart conceptually illustrating a process of the control device 100-1 according to the embodiment.

First, the control device 100-1 waits until the position attitude information regarding the manipulation object 200-1 is received (step S602). Specifically, the communication unit 102 receives the position attitude information regarding the manipulation object 200-1 generated in the manipulation object 200-1.

When the position attitude information is received, the control device 100-1 decides the image visual field of the manipulation object 200-1 based on the received position attitude information regarding the manipulation object 200-1 (step S604). Specifically, the decision unit 106 changes the image visual field of the manipulation object 200-1 according to a change amount of the position attitude indicated by the received position attitude information regarding the manipulation object 200-1.

Next, the control device 100-1 acquires the position attitude information regarding the control device 100-1 (step S606). Specifically, the decision unit 106 acquires the position attitude information including information indicating the change amount of the position attitude of the control device 100-1 detected by the sensor 104 from the sensor 104.

Next, the control device 100-1 decides the image visual field of the user based on the acquired position attitude information regarding the control device 100-1 (step S608). Specifically, the decision unit 106 changes the image visual field of the user according to a change amount of the position attitude indicated by the acquired position attitude information regarding the control device 100-1.

Next, the control device 100-1 determines whether the position attitudes of the manipulation object 200-1 and the head of the user are changed in mutually different directions (step S610). Specifically, the decision unit 106 determines whether the change direction of the position attitude of the manipulation object 200-1 is different from the change direction of the position attitude of the head of the user.

When it is determined that the position attitudes of the manipulation object 200-1 and the head of the user are changed in mutually different directions, the control device 100-1 generates an image based on the image visual field of the user (step S612). Specifically, when the change direction of the position attitude of the manipulation object 200-1 is determined to be different from the change direction of the position attitude of the head of the user, the display control unit 108 generates an image indicating a virtual space based on the image visual field of the user.

Further, when it is determined that the position attitudes of the manipulation object 200-1 and the head of the user are not changed in the mutually different directions, the control device 100-1 generates an image based on the image visual field of the manipulation object 200-1 (step S614). Specifically, when it is determined that the change direction of the position attitude of the manipulation object 200-1 is the same as the change direction of the position attitude of the head of the user or is different from the change direction of the position attitude of the head of the user so that the change direction of the position attitude of the manipulation object 200-1 is considered to be the same as the change direction of the position attitude of the head of the user, the display control unit 108 generates an image indicating a virtual space based on the image visual field of the manipulation object 200-1. Moreover, even when one or both of the position attitudes of the manipulation object 200-1 and the head of the user are not changed, the decision unit 106 performs the same determination as the foregoing determination.

The control device 100-1 displays the generated image (step S616). Specifically, the display control unit 108 causes the display unit 110 to display the generated image.

In this way, according to the first embodiment of the present disclosure, the control device 100-1 receives the position attitude information related to the position attitude of the object related to the user manipulation and located at the different position from the head of the user and controls the image visual field which is the range displayed as the image on the display unit mounted on the head of the user based on the position attitude information. Therefore, by displaying the image according to the position attitude of the manipulation object or the like manipulated by the user, it is possible to control the range which is a display target of the display device according to an intention of the user although the user does not move his or her head. Further, thus, it is possible to provide the user with a dynamic viewpoint change in a movement exceeding a movable range of the head of the user.

Further, the foregoing image view field includes at least a part of a virtual space. Therefore, by deciding a range to be displayed in the virtual space through a manipulation of the real world, it is possible to improve a sense of immersion in the virtual space.

Further, the control device 100-1 acquires the position attitude information regarding the head of the user and selects one of the image visual field of the manipulation object 200-1 and the image visual field of the user as a range displayed as an image based on a situation of the user. Therefore, by switching the image visual field, it is possible to display an image generated based on the image visual field suitable for the user.

Further, the control device 100-1 selects the image visual field of the user when the predetermined user manipulation is performed. Therefore, by switching the image visual field due to the manipulation by the user, it is possible to reduce a possibility of a feeling of abruptness being caused for the user in the switching of the image visual field.

Further, the control device 100-1 selects the image visual field of the user when the position attitudes of the object related to the user manipulation and the head of the user are changed in the mutually different directions. In general, when human beings change their visual fields, human begins move or rotate their heads. Therefore, the user of the control device 100-1 can move his or her head when the user manipulates the manipulation object 200-1 to change the image visual field. Here, when the change direction of the image visual field of the manipulation object 200-1 is different from the change direction of the head of the user, that is, the change direction of the image visual field of the user, the user may feel a sense of discomfort and feels nauseated in some cases. Accordingly, in this case, the control device 100-1 can suppress occurrence of the sense of discomfort of the user by performing display based on the image visual field of the user.

<2-3. Modification Examples>

The first embodiment of the present disclosure has been described above. Moreover, the embodiment is not limited to the above-described example. Hereinafter, first to seventh modification examples of the embodiment will be described.

First Modification Example

In the first modification example of the embodiment, when the user has visually induced motion sickness, the control device 100-1 may switch an image to an image generated based on the image visual field of the user. Specifically, the control device 100-1 further includes a determination unit that determines whether the user is in a visually induced motion sickness state. When the determination unit determines that the user is in a visually induced motion sickness state, the display control unit 108 selects the image visual field of the user. More specifically, the determination unit determines that the user is in a visually induced motion sickness state when a displacement of the head of the user is equal to or greater than a threshold.

For example, the determination unit calculates a displacement amount of the head based on the position attitude information regarding the head of the user detected by the sensor 104. Then, the determination unit determines that the user is in a visually induced motion sickness state when the calculated displacement amount of the head is equal to or greater than the threshold. When the determination unit determines that the user is in a visually induced motion sickness state and the image visual field of the manipulation object 200-1 is selected, the display control unit 108 selects the image visual field of the user and causes the display unit 110 to switch the image to an image generated based on the image visual field of the user.

In this way, according to the first modification example of the embodiment, the control device 100-1 includes the determination unit that determines whether the user is in a visually induced motion sickness state. When the determination unit determines that the user is in a visually induced motion sickness state, the display control unit 108 selects the image visual field of the user. Therefore, by switching the image visual field according to a change in body conditions of the user, it is possible to prevent the body conditions of the user from becoming worse.

Further, the determination unit determines that the user is in a visually induced motion sickness state when the displacement of the head of the user is equal to or greater than the threshold. Therefore, by determining a visually induced motion sickness state based on information acquired by the sensor 104, it is possible to suppress addition of a function to the control device 100-1. Thus, it is possible to reduce the cost of the control device 100-1.

Moreover, based on biological information regarding the user, the determination unit may determine whether the user is in a visually induced motion sickness state. For example, based on a perspiration or pulse state of the user, the determination unit can determine whether the user is in a visually induced motion sickness state. Further, a technology for determining motion sickness may be applied.

Second Modification Example

In a second modification example of the embodiment, when a plurality of users share a virtual space, an image visual field may differ for each user. Specifically, the display control unit 108 selects one of an image visual field of the manipulation object 200-1 or an image visual field of a user based on whether the user is a manipulator of the image visual field of the manipulation object 200-1. Furthermore, a process of the modification example will be described in detail with reference to FIG. 3.

The communication unit 102 performs communication with another control device 100-1 to transmit and receive a manipulation request for virtual display. For example, the communication unit 102 transmits a manipulation request to another control device 100-1 based on a user manipulation or the like. Further, when the communication unit 102 receives a manipulation request from another control device 100-1, the communication unit 102 notifies the display control unit 108 of the reception of the manipulation request. Then, the display control unit 108 causes the display unit 110 to perform display for prompting the user to determine whether to comply with the manipulation request and perform a manipulation. When the user performs a manipulation indicating the compliance with the manipulation request, the communication unit 102 transmits a response to the manipulation request to the other control device 100-1.

Then, when the transmitted response to the manipulation request is received from the other control device 100-1, the display control unit 108 causes the display unit 110 to display an image generated based on an image visual field of the manipulation object 200-1. For example, as illustrated in the left drawing of FIG. 3, the display control unit 108 causes the display unit 110 to display the image generated based on the image visual field of the manipulation object 200-1 connected to the control device 100-1.

Thereafter, when a manipulation request is received from the other control unit 100-1, the display control unit 108 selects an image generated based on an image visual field of the user. For example, when a response indicating compliance with the manipulation request of the other control unit 100-1 is received, the display control unit 108 switches the image displayed on the display unit 110 to the image generated based on the image visual field of the user, as illustrated in the right drawing of FIG. 3.

In this way, according to the second modification example of the embodiment, the display control unit 108 selects one of the image visual field of the manipulation object 200-1 and the image visual field of the user based on whether the user is the manipulator of the image visual field of the manipulation object 200-1. Therefore, when a virtual space is shared by a plurality of users, it is possible to prevent an image generated based on an image visual field of the manipulation object 200-1 manipulated by another user from being displayed and prevent the user from being in a visually induced motion sickness state.

Moreover, in an image generated based on the image visual field of the user, an object indicating an image visual field of the manipulation object 200-1 of another user may be displayed.

Third Modification Example

In a third modification example of the embodiment, the control unit 100-1 may recognize a part of a body (hereinafter also referred to as a part of a user's body) other than the head of the user as the manipulation object 200-1. Specifically, based on position attitude information regarding the part of the user's body, the decision unit 106 decides an image visual field in which the part of the user's body is a visual line source (hereinafter also referred to as an image visual field of the part of the user's body). The display control unit 108 causes the display unit 110 to display an image generated based on the image visual field of the part of the user's body. Moreover, the position attitude information regarding the part of the user's body may be acquired from a motion sensor mounted on the part of the user's body or may be acquired through communication from an external device of the control device 100-1 when the external device analyzes an image in which the part of the user's body is a subject. Furthermore, the modification example will be described in detail with reference to FIGS. 6A to 6D. FIGS. 6A to 6D are diagrams illustrating examples parts of a user's body recognized as the manipulation object 200-1 and the shape of the part of the user's body.

Figure 6A:
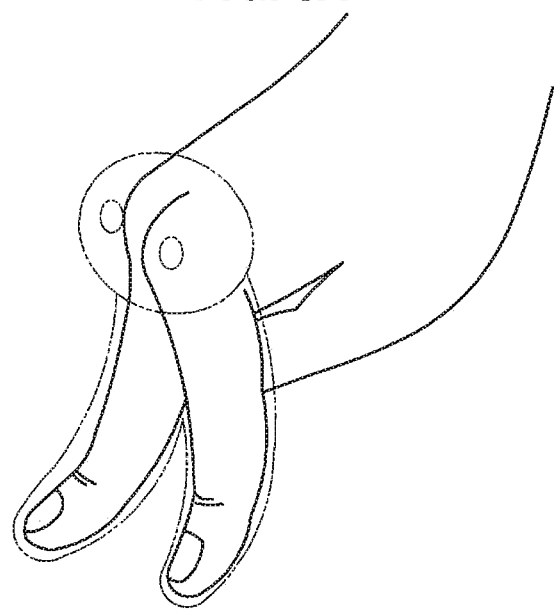
FIG. 6A is a diagram illustrating an example of a part of a user's body recognized as a manipulation object and the shape of the part of the user's body.
Figure 6B:
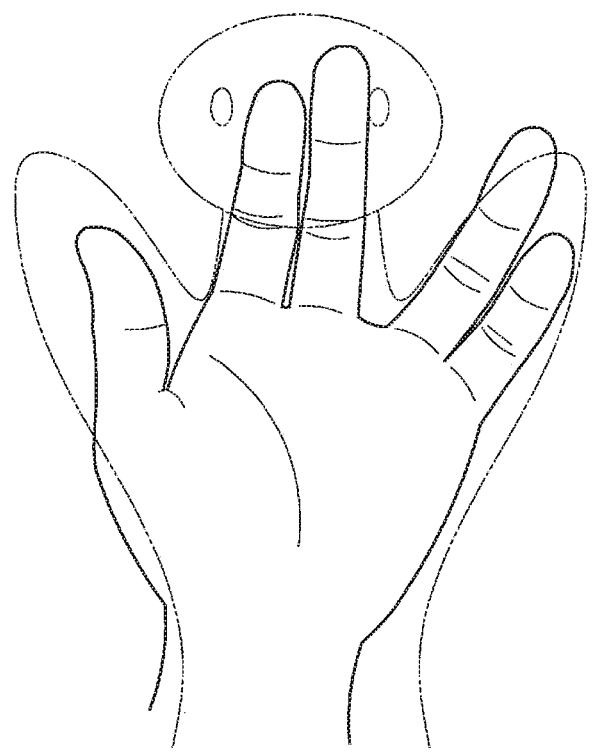
FIG. 6B is a diagram illustrating an example of a part of a user's body recognized as a manipulation object and the shape of the part of the user's body.
Figure 6C:
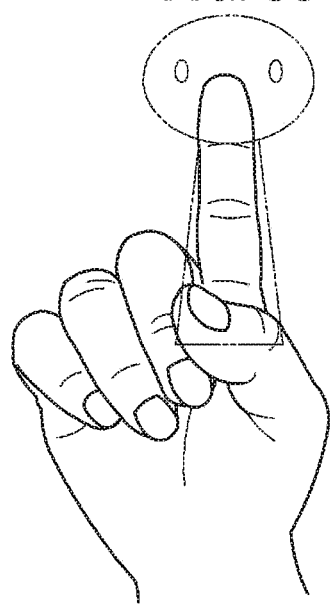
FIG. 6C is a diagram illustrating an example of a part of a user's body recognized as a manipulation object and the shape of the part of the user's body.
Figure 6D:
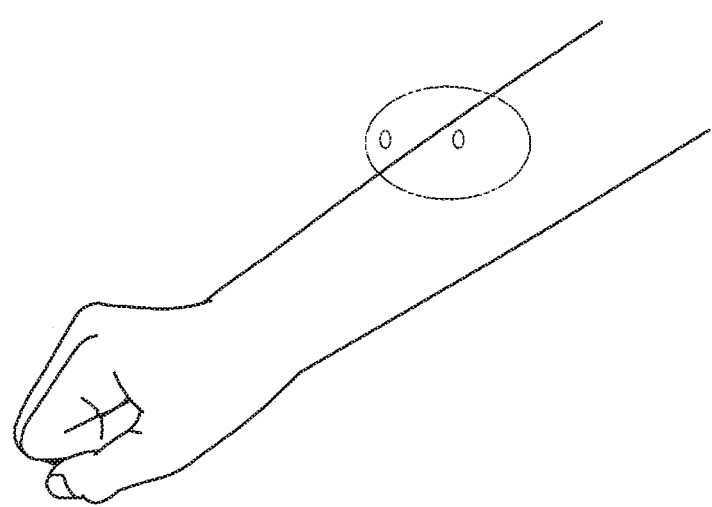
FIG. 6D is a diagram illustrating an example of a part of a user's body recognized as a manipulation object and the shape of the part of the user's body.

First, the decision unit 106 specifies a shape of a part of a user's body. For example, the position attitude information includes information indicating a part of a user's body and the shape of the part of the user's body (hereinafter also referred to as part information). Then, the decision unit 106 acquires the part information from the acquired position attitude information and specifies the shape of the part of the user's body by comparing the shape of the part indicated by the acquired part information to parts and shape patterns stored in a storage unit separately included in the control device 100-1. As the shape of the part of the user's body, for example, a shape in which two fingers are erected while the back of a hand faces toward the front side, as illustrated in FIG. 6A, a shape in which two fingers of each of two sets are aligned together and the remaining finger are separated while the palm of a hand faces toward the front side, as illustrated in FIG. 6B, a shape in which one of five fingers is stretched while facing the palm of a hand toward the front side, as illustrated in FIG. 6C, and a shape in which an arm is pushed out while facing the back of a hand toward the front side, as illustrated in FIG. 6D, can be considered.

Next, the decision unit 106 decides an image visual field of a part of a user's body based on a specified shape of the part of the user's body. For example, a position serving as a visual line source can be decided in advance according to the shape of the part of the user's body. For example, in the shape illustrated in FIG. 6A, the bases of two fingers serve as a visual line source. In the shape illustrated in FIG. 6B, the front ends of two fingers arranged in the middle serve as a visual line source. In the shape illustrated in FIG. 6C, the front end of a stretched finger is a visual line source. In the shape illustrated in FIG. 6D, a predetermined position of an arm between a hand and an elbow is a visual line source. Therefore, the decision unit 106 sets an image visual field in which a position specified according to the shape of the part of the user's body is a visual line source as an initial visual field of the image visual field of the part of the user's body and decides the image visual field of the part of the user's body based on the acquired position attitude information.

Then, the display control unit 108 causes the display unit 110 to display an image generated based on the decided image visual field of the part of the user's body. The details are substantially the same as the process of the first embodiment, and thus the description thereof will be omitted.

In this way, according to the third modification example of the embodiment, the decision unit 106 decides the image visual field of the part of the user's body from the position attitude information regarding the part of the user's body and the display control unit 108 causes the display unit 110 to display the image generated based on the image visual field of the part of the user's body. Therefore, when the part of the user's body is regarded as a manipulation body, the user can perform a manipulation in a different image visual field from the visual field of the user more simply than when the manipulation body is a device.

Moreover, the shapes illustrated in FIGS. 6A to 6D have been described above as examples of the parts of the user's body, but the parts of the user's body are not limited thereto. Various parts capable of expressing a movement of the head of the user can be used.

Fourth Modification Example

Figure 7:
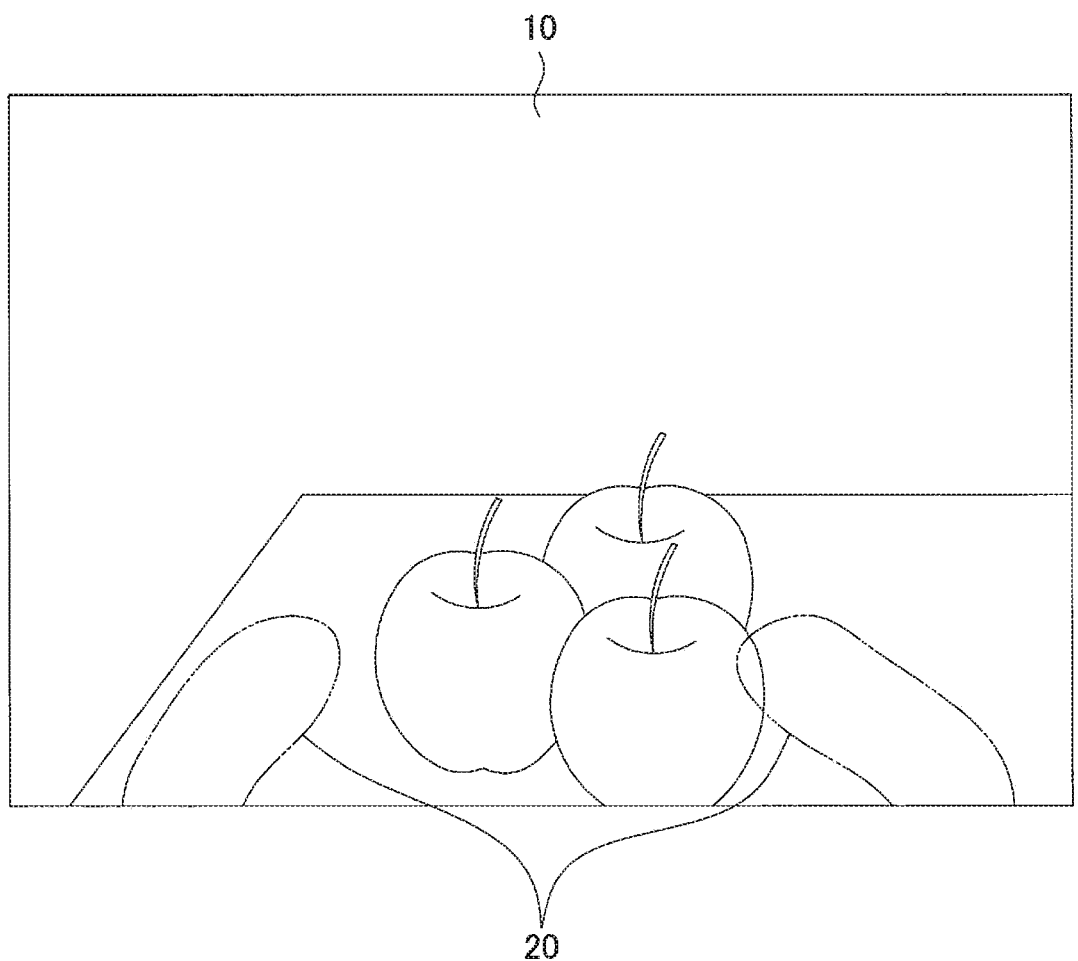
FIG. 7 is a diagram illustrating an example of a correspondence object displayed on the control device according to a fourth modification example of the embodiment.

In a fourth modification example of the embodiment, the control device 100-1 may perform display corresponding to the manipulation object 200-1 (hereinafter also referred to as a correspondence object) in an image generated based on an image visual field of the manipulation object 200-1. Specifically, the display control unit 108 causes the display unit 110 to display a correspondence object indicating at least a part of the manipulation object 200-1 in the image generated based on the image visual field of the manipulation object 200-1. Furthermore, a process according to the modification example will be described in detail with reference to FIG. 7. FIG. 7 is a diagram illustrating an example of the correspondence object displayed by the control device 100-1 according to a fourth modification example of the embodiment.

First, the display control unit 108 acquires the correspondence object according to a shape or kind of the manipulation object 200-1. For example, the communication unit 102 receives information indicating the kind of the manipulation object 200-1 connected to the control device 100-1 from the manipulation object 200-1. Then, the display control unit 108 acquires the correspondence object corresponding to the kind of manipulation object 200-1 indicated by the received information from a storage unit. For example, when the manipulation object 200-1 has a doll shape, the correspondence object can be an object 20 indicating hands and arms of a doll illustrated in FIG. 7. Moreover, the display control unit 108 may acquire a correspondence object from an external device via the communication unit 102.

Next, the display control unit 108 performs control such that the correspondence object is displayed in an image generated based on an image visual field of the manipulation object 200-1. For example, the acquired object 20 is superimposed on the image 10 generated based on the image visual field of the manipulation object 200-1 displayed on the display unit 110.

Moreover, display of a virtual object can be changed according to a position attitude of the manipulation object 200-1. For example, when the manipulation object 200-1 is a doll and the hands of the doll are bent, the hands of the doll of the object 20 illustrated in FIG. 7 is bent.

In this way, according to the fourth modification example of the embodiment, the display control unit 108 performs control such that the correspondence object corresponding to the manipulation object 200-1 is displayed in the image generated based on the image visual field of the manipulation object 200-1. Therefore, it is possible to cause the user to recognize that the display is controlled through a user manipulation and it is possible to improve consistency of a sense of the user manipulation and a change in the display.

Further, the correspondence object indicates at least a part of the manipulation object 200-1. Therefore, by providing an impression that the correspondence object agrees with the manipulation object 200-1, it is possible to improve a sense of reality in a manipulation on a virtual space.

Further, the correspondence object differs according to the shape or kind of the manipulation object 200-1. Therefore, by causing the manipulation object 200-1 to correspond to the display of the virtual object, it is possible to further improve the sense of reality in a manipulation on a virtual space.

Moreover, the example in which the manipulation object 200-1 is a device has been described above, but the manipulation object 200-1 may be a part of a user's body. Further, the example in which the correspondence object is displayed on the image generated based on the image visual field of the manipulation object 200-1 has been described, but the correspondence object may be displayed in an image generated based on the image visual field of the user.

Fifth Modification Example

Figure 8:
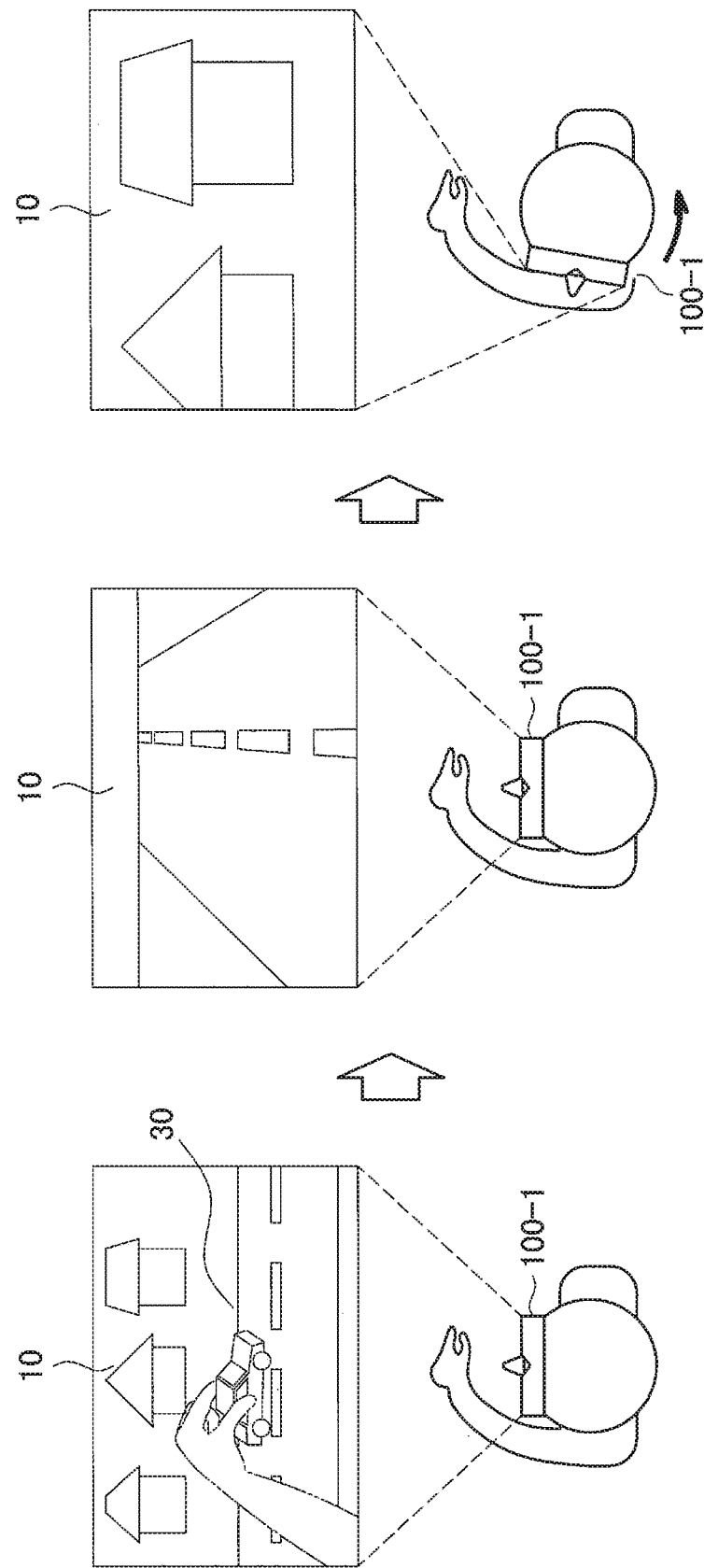
FIG. 8 is a diagram for describing an image generated based on an image visual field in a process of the control device according to a fifth modification example of the embodiment.

In a fifth modification example of the embodiment, the control device 100-1 may display an image generated based on an image visual field (hereinafter also referred to as an image visual field of a virtual object) specified based on a position attitude of an object on a virtual space (hereinafter referred to as a virtual object). Specifically, the display control unit 108 specifies a movement direction of the virtual object on the virtual space and causes the display unit 110 to display an image generated based on an image visual field in which the specified movement direction is a visual line destination. Furthermore, a process according to the modification example will be described in detail with reference to FIG. 8. FIG. 8 is a diagram for describing an image generated based on an image visual field in a process of the control device 100-1 according to the fifth modification example of the embodiment.

First, the display control unit 108 causes the display unit 110 to display the virtual object. For example, the display control unit 108 can display a virtual object 30 such as a vehicle illustrated in the left drawing of FIG. 8 in the image 10 generated based on an image visual field of the manipulation object 200-1.

Next, when the virtual object is selected, the display control unit 108 causes the display unit 110 to switch display in the image generated based on an image visual field in which the virtual object is a visual line source. For example, when the virtual object 30 illustrated in the left drawing of FIG. 8 is picked, the display control unit 108 causes the display unit 110 to switch the display to the image 10 generated based on an image visual field in a movement direction of the virtual object 30 in which the virtual object 30 is a visual line source, as illustrated in the middle drawing of FIG. 8.

Next, when the position attitude of the virtual object is changed through a user manipulation, the decision unit 106 changes the image visual field according to a change in the position attitude of the virtual object. For example, the decision unit 106 detects the change in the position attitude from coordinate information or the like regarding the virtual object and changes the image visual field of the virtual object according to this change.

Then, the display control unit 108 causes the display unit 110 to display an image generated based on the image visual field of the virtual object. The details are substantially the same as the details described above in the embodiment or the like, and thus the description thereof will be omitted.

In this way, according to the fifth modification example of the embodiment, the display control unit 108 causes the display unit 110 to display an image generated based on the image visual field specified based on the position attitude of the object on the virtual space. Therefore, by switching the display to the image generated based on the image visual field of the virtual object manipulated by the user on the virtual space, it is possible to improve a sense of immersion of the user in the virtual space.

Sixth Modification Example

In a sixth modification example of the embodiment, the control device 100-1 may control the image visual field of the virtual object in the fifth modification example based on position attitude information regarding the head of the user. Specifically, the display control unit 108 changes the image visual field of the virtual object according to a change in the position or the attitude of the head of the user. Furthermore, a process according to the modification example will be described in detail with reference to FIG. 8.

First, when a manipulation of selecting a virtual object is performed, the display control unit 108 causes the display unit 110 to display the virtual object and switch an image generated based on the image visual field of the virtual object. Here, the position attitude of the head of the user at the time of the switching of the image can be a position attitude of a visual line source with respect to the image visual field related to the image after switching. Moreover, an image switching process is substantially the same as the process of the fifth modification example, and thus the description thereof will be omitted.

Next, the decision unit 106 changes the image visual field of the virtual object according to the change when the position attitude of the head of the user is changed. For example, when a change in the position attitude of the control device 100-1, that is, the head of the user, is detected by the sensor 104, as illustrated in the right drawing of FIG. 8, the decision unit 106 changes the image visual field of the virtual object 30 according to a change amount from the position attitude of the visual line source of the head of the user.

Then, the display control unit 108 causes the display unit 110 to display an image generated based on the changed image visual field of the virtual object. For example, the display control unit 108 causes the display unit 110 to display an image in which a landscape on the left side in a traveling direction of a vehicle which is the virtual object 30 is viewed from the vehicle, as illustrated in the right drawing of FIG. 8.

In this way, according to the sixth modification example of the embodiment, the display control unit 108 controls the image visual field of the virtual object in the fifth modification example based on the position attitude information regarding the head of the user. Therefore, by changing the image visual field of the virtual object according to a motion of the head of the user in the real space, it is possible to further improve a sense of immersion in the virtual space.

Moreover, the example in which the image visual field of the virtual object is changed has been described above, but the image visual field of the manipulation object 200-1 may be changed.

Seventh Modification Example

Figure 9:
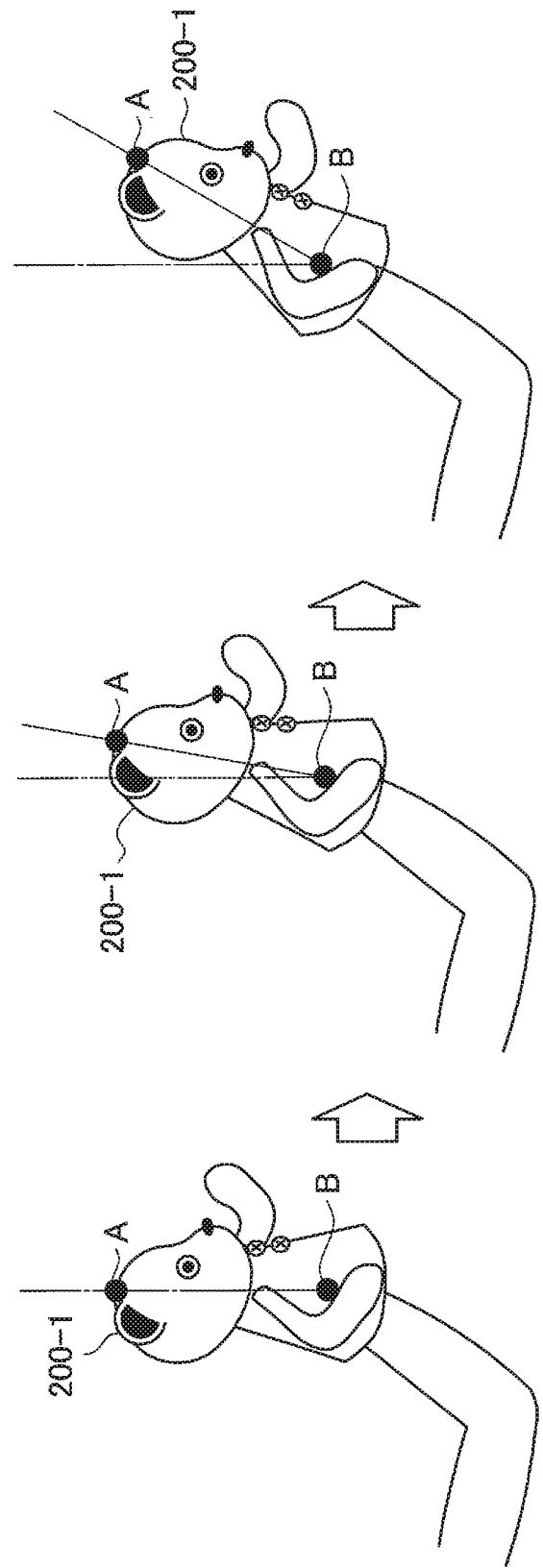
FIG. 9 is a diagram illustrating an example of a change in an attitude of a part of the manipulation object connected to the control device according to a seventh modification example of the embodiment.

In a seventh modification example of the embodiment, the control device 100-1 may change a movement speed of a virtual object on a virtual space according to a change in the attitude of the manipulation object 200-1. Specifically, when the position attitude of a part of the manipulation object 200-1 is changed, the display control unit 108 changes the movement speed of the virtual object on the virtual space according to the change in the position attitude of a part of the manipulation object 200-1. Furthermore, a process according to the modification example will be described in detail with reference to FIG. 9. FIG. 9 is a diagram illustrating an example of a change in an attitude of a part of the manipulation object 200-1 connected to the control device 100-1 according to the seventh modification example of the embodiment.

The manipulation object 200-1 detects a plurality of pieces of position attitude information. For example, the manipulation object 200-1 includes two sensors 202. The control unit 204 generates position attitude information based on a change in the position attitude detected by each sensor 202. For example, the sensors 202 can be provided in a head portion A and a lower portion B of the manipulation object 200-1, respectively. Moreover, the form in which the sensors 202 are provided is not limited thereto. For example, the sensors 202 can be installed indirectly in each of major portions of the user. Further, the position attitude information includes information indicating positions at which the sensors 202 are provided.

When the position attitude information is received from the manipulation object 200-1, the display control unit 108 determines whether the position attitude of only a part of the manipulation object 200-1 is changed. For example, as illustrated in FIG. 9, when only the upper half of the manipulation object 200-1 is inclined centering on the lower portion B, the sensor 202 provided in the head portion A detects the fact that the attitude is changed, but the sensor 202 provided in the lower portion B detects the fact that the attitude is not changed or is changed only to an extent considered as no change. Therefore, the position attitude information related to the sensor 202 provided in the head portion A is received, but the position attitude information related to the sensor 202 provided in the lower portion B is not received. Accordingly, based on whether the position attitude information is received, the display control unit 108 determines that the position attitude of only a part of the manipulation object 200-1 is changed. Here, the display control unit 108 determines that the attitude of only the periphery of the head portion A of the manipulation object 200-1 is changed.

Then, when the display control unit 108 determines that the position attitude of only a part of the manipulation object 200-1 is changed, the display control unit 108 changes a movement speed of the virtual object. For example, as illustrated in FIG. 9, when the attitude of only the periphery of the head portion A of the manipulation object 200-1 is changed, the display control unit 108 improves the movement speed of the virtual object without changing the image visual field of the manipulation object 200-1.

Furthermore, the display control unit 108 changes the movement speed of the virtual object according to a change amount from a reference of the position attitude indicated by the position attitude information. For example, as illustrated in the left drawing of FIG. 9, a position attitude in an initial visual field can be set as the reference. Then, when the attitude is changed up to an angle illustrated in the middle drawing of FIG. 9 centering on the lower portion B, the movement speed of the virtual object is improved. Furthermore, when the attitude is changed up to an angle illustrated in the right drawing of FIG. 9, the movement speed of the virtual object is further improved.

In this way, according to the seventh modification example of the embodiment, the display control unit 108 changes the movement speed of the virtual object on the virtual space according to the change amount of the position attitude of a part of the manipulation object 200-1 when the position attitude of only a part of the manipulation object 200-1 is changed. Therefore, by intuitively manipulating the virtual object, it is possible to suppress a return of the consciousness from the virtual space to the real space because of the manipulation.

Moreover, the example in which the position attitude information is not received when the position attitude of the manipulation object 200-1 is not changed has been described above. However, when the fact that the position attitude of the manipulation object 200-1 is changed is detected by one of the sensors 202, the control unit 204 may cause the communication unit 206 to transmit the position attitude information regarding each sensor 202. In this case, the display control unit 108 compares the received position attitude information to the previous position attitude information to determine whether the position attitude is changed.

Further, the case in which the position attitude at a different position of one manipulation object 200-1 is changed has been described above, but the display control unit 108 may perform a process based on a change in the position attitude of each of the plurality of manipulation objects 200-1. For example, when the position attitude of only one manipulation object 200-1 among the plurality of manipulation objects 200-1 is changed, the display control unit 108 changes a movement speed of a virtual object on a virtual space according to a change in the position attitude of the one manipulation object 200-1. In this case, a manipulation of changing the movement speed of the virtual object can be performed more easily than in the case of one manipulation object 200-1, and thus it is possible to improve manipulability of the user.

<3. Second Embodiment (Example in Which Image Visual Field is Controlled Based on Position Attitude of Operation Device)>

The control device 100-1 according to the first embodiment of the embodiment has been described above. Next, a control device 100-2 according to a second embodiment of the embodiment will be described. The control device 100-2 controls an image visual field related to an image of an operation device 300 controlled according to a manipulation on a manipulation object 200-2.

<3-1. Configuration of Control Device>

Figure 10:
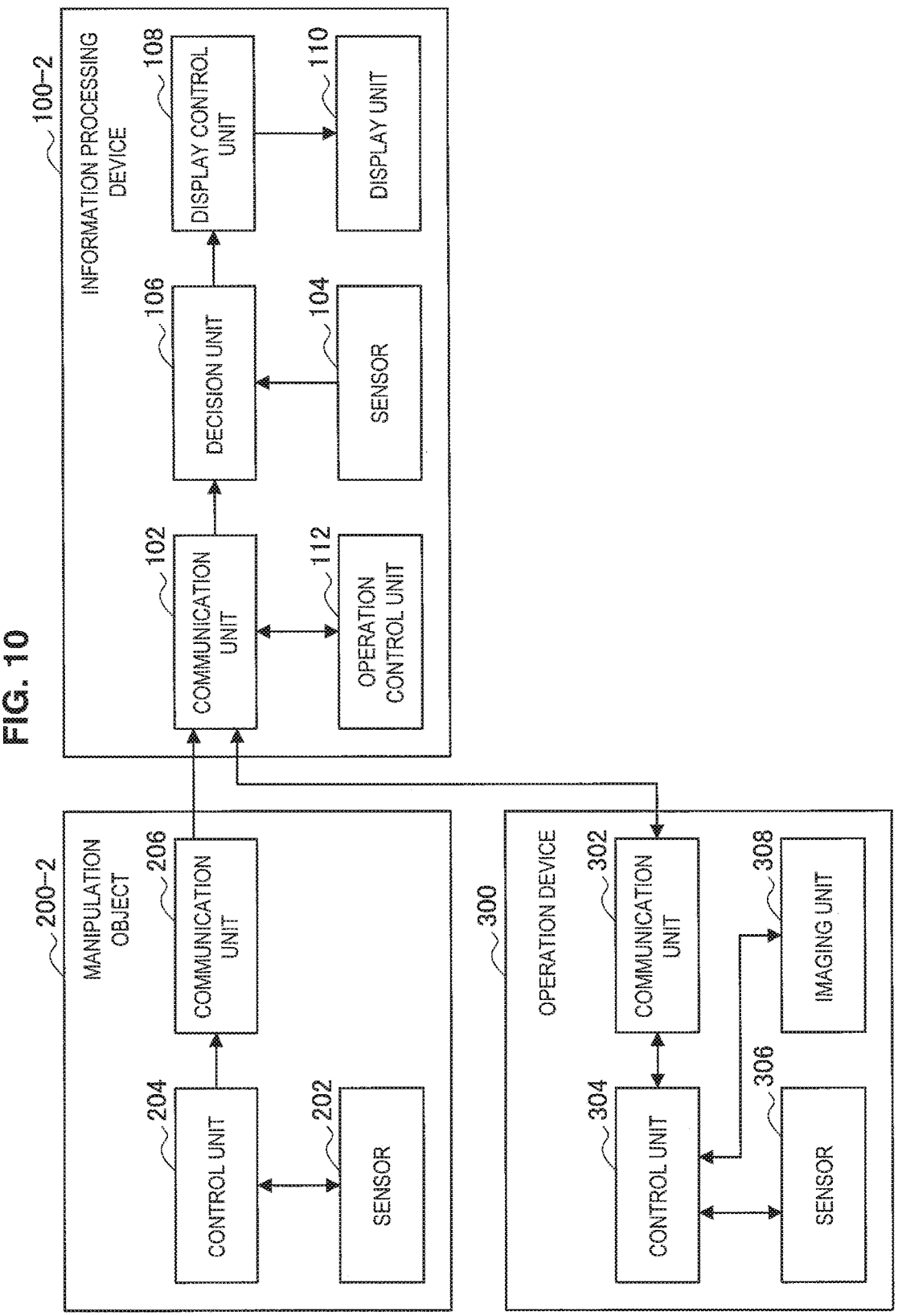
FIG. 10 is a block diagram illustrating a schematic functional configuration of a control system configured using a control device according to a second embodiment of the present disclosure.

First, the configurations of the control system and the control device 100-2 according to the second embodiment of the present disclosure will be described with reference to FIG. 10. FIG. 10 is a block diagram illustrating a schematic functional configuration of the control system configured using the control device 100-2 according to the second embodiment of the present disclosure. Moreover, the description of substantially the same functions as the functions according to the first embodiment will be omitted.

As illustrated in FIG. 10, a control system according to the second embodiment is configured to include the control device 100-2, the manipulation object 200-2, and the operation device 300.

(Functional Configuration of Control Device 100-2)

The control device 100-2 includes an operation control unit 112 in addition to the communication unit 102, the sensor 104, the decision unit 106, the display control unit 108, and the display unit 110.

The communication unit 102 communicates with the operation device 300. Specifically, the communication unit 102 transmits an operation request to the operation device 300 and receives position attitude information and an image from the operation device 300.

The operation control unit 112 serving as a control unit controls the operation device 300 based on the position attitude information regarding the manipulation object 200-2. Specifically, the operation control unit 112 generates an operation request for causing the operation device 300 to change a position attitude according to a change in a position attitude indicated by position attitude information received from the manipulation object 200-2.

The decision unit 106 decides the image visual field related to the operation device 300. Specifically, the decision unit 106 decides an image visual field in which the operation device 300 is a visual line source (hereinafter also referred to as an image visual field of the operation device 300) based on the position attitude information regarding the operation device 300 received by the communication unit 102. The details of the process are substantially the same as the process of deciding the image visual field of the manipulation object 200-1 in the first embodiment, and thus the description thereof will be omitted.

The display control unit 108 causes the display unit 110 to display the image received from the operation device 300. Further, the display control unit 108 selects one of an image visual field of the operation device 300 and an image visual field of a user based on a situation of the user. Moreover, the display control unit 108 selects the image visual field of the user when the position attitudes of the operation device 300 and the head of the user are changed in mutually different directions. An image generated based on the image visual field of the user may be a wide angle image or an entire celestial sphere image or may be an image generated by combining images obtained through imaging by a plurality of imaging units or an external image device. The details of the process are substantially the same as the process in the first embodiment, and thus the description thereof will be omitted.

(Functional Configuration of Operation Device 300)

As illustrated in FIG. 10, the operation device 300 includes a communication unit 302, a control unit 304, a sensor 306, and an imaging unit 308.

The communication unit 302 communicates with the control device 100-2. Specifically, the communication unit 302 receives an operation request from the control device 100-2 and transmits position attitude information and an image to the control device 100-2. Moreover, the communication unit 302 performs communication with the control device 100-2 through wired communication or wireless communication.

The control unit 304 controls all of the operations of the operation device 300. Specifically, the control unit 304 generates position attitude information based on a change in a position attitude detected by the sensor 306 and causes the communication unit 302 to transmit the generated position attitude information to the control device 100-2.

Further, the control unit 304 controls a motion of the operation device 300 based on an operation request received from the control device 100-2. For example, the control unit 304 instructs a motor, an actuator, and the like separately included in the operation device 300 to operate and causes the operation device 300 to perform an operation according to the operation request from the control device 100-2.

Further, the control unit 304 controls an operation of the imaging unit 308. For example, in response to the operation instruction, the control unit 304 transitions the imaging unit 308 to an imaging state or transitions the imaging unit 308 from the imaging state to an original state. The control unit 304 causes the communication unit 302 to transmit an image obtained through imaging by the imaging unit 308 to the control device 100-2.

The sensor 306 detects a change in the position attitude of the operation device 300. Moreover, the sensor 306 according to the embodiment is substantially the same as the sensors 104 and 202 in the first embodiment, and thus the detailed description thereof will be omitted.

The imaging unit 308 images a part of the real space in the periphery of the operation device 300. Specifically, the imaging unit 308 transitions to the imaging state based on an operation instruction from the control unit 304 and periodically performs imaging during the imaging state. Then, the imaging unit 308 supplies an image obtained through the imaging to the control unit 304. For example, the imaging unit 308 can include an imaging optical system such as a photographing lens and a zoom lens condensing light and a signal conversion element such as a charge coupled device (CCD) or a complementary metal oxide semiconductor (CMOS). Moreover, the imaging unit 308 may perform imaging of a wide angle or an entire celestial sphere.

<3-2. Process of Control Device>

Figure 11:
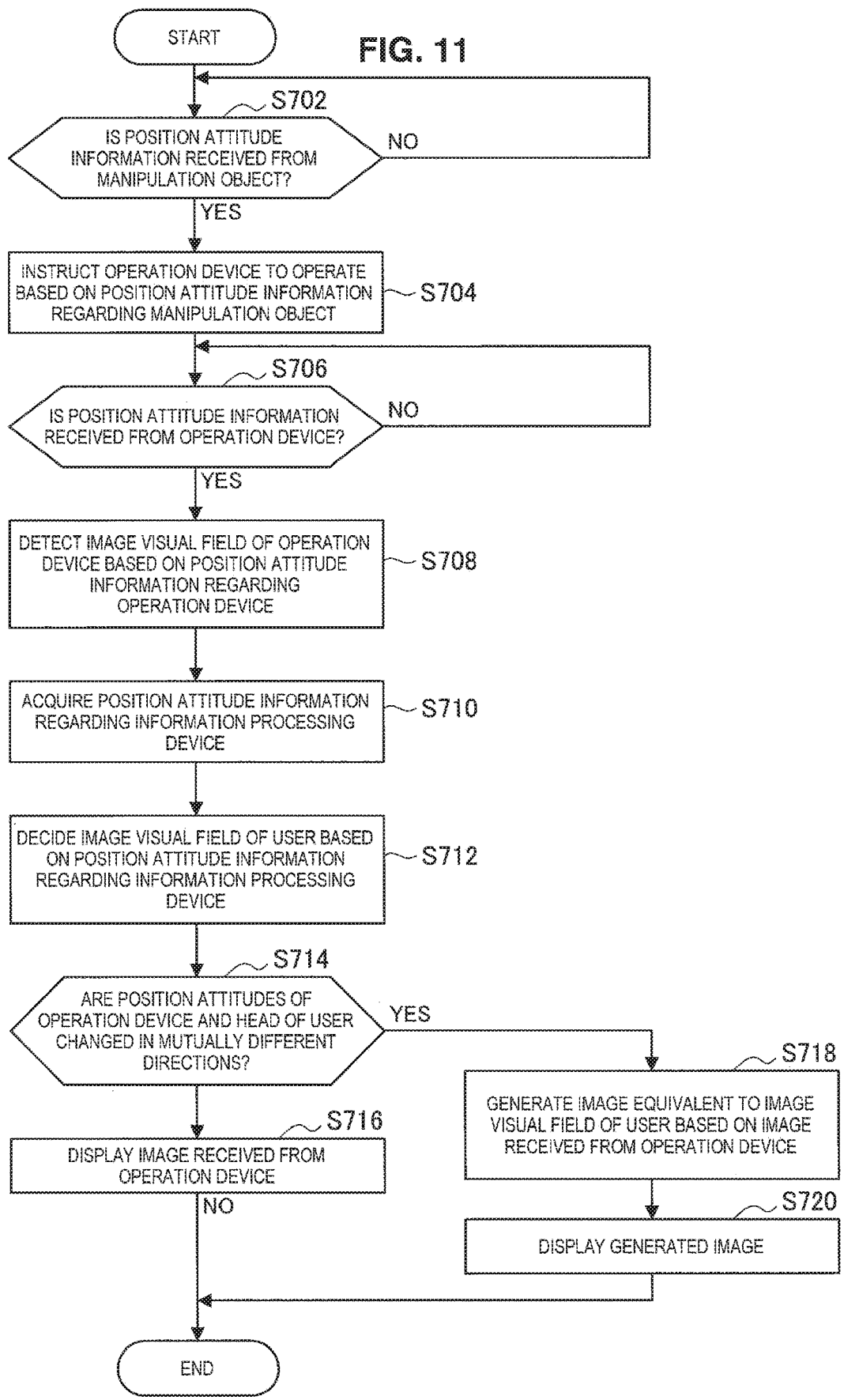
FIG. 11 is a flowchart conceptually illustrating a process of the control device according to the embodiment.

Next, a process of the control device 100-2 according to the embodiment will be described with reference to FIG. 11. FIG. 11 is a flowchart conceptually illustrating a process of the control device 100-2 according to the embodiment. Moreover, the description of substantially the same functions as the functions according to the first embodiment will be omitted.

First, the control device 100-2 waits until position attitude information regarding the manipulation object 200-2 is received (step S702).

When the position attitude information is received from the manipulation object 200-2, the control device 100-2 instructs the operation device 300 to operate based on the position attitude information regarding the manipulation object (step S704). Specifically, the operation control unit 112 generates an operation request based on the position attitude information received from the manipulation object 200-2. Then, the operation control unit 112 causes the communication unit 102 to transmit the generated operation request to the operation device 300.

Next, the control device 100-2 waits until the position attitude information is received from the operation device 300 (step S706).

When the position attitude information is received from the operation device 300, the control device 100-2 detects an image visual field of the operation device 300 based on the position attitude information regarding the operation device 300 (step S708).

Next, the control device 100-2 acquires the position attitude information regarding the control device (step S710) and decides the image visual field of the user based on the acquired position attitude information regarding the control device (step S712).

Next, the control device 100-2 determines whether the position attitudes of the operation device 300 and the head of the user are changed in mutually different directions (step S714).

When the control device 100-2 determines that the position attitudes of the operation device 300 and the head of the user are not changed in the mutually different directions, the control device 100-2 displays an image received from the operation device (step S716). Specifically, the communication unit 102 receives an image obtained through imaging by the imaging unit 308 from the operation device 300. Then, when it is determined that the change direction of the position attitude of the operation device 300 is the same as the change direction of the position attitude of the head of the user or is considered to be different from the change direction of the position attitude of the head of the user to the degree that the change directions are the same one another, the display control unit 108 causes the display unit 110 to display the received image.

When it is determined that the position attitudes of the operation device 300 and the head of the user are changed in the mutually different directions, the control device 100-2 generates an image equivalent to the image visual field of the user based on the image received from the operation device 300 (step S718) and displays the generated image (step S720). Specifically, when it is determined that the change direction of the position attitude of the operation device 300 is different from the change direction of the position attitude of the head of the user, the display control unit 108 generates an image based on the image received from the operation device 300. For example, the display control unit 108 combines the plurality of received images to generate one image. Then, the display control unit 108 causes the display unit 110 to display the generated image. The generated image is generated based on the broadness of the image visual field of the user.

In this way, according to the second embodiment of the present disclosure, the control device 100-2 controls display based on the image visual field of the operation device 300 controlled according to a manipulation on the manipulation object 200-2. Therefore, for example, it is possible to suppress visually induced motion sickness of a user due to an image generated based on an image visual field of a robot or the like changing through a manipulation which does not agree with a motion of the head of the user in a manipulation on the robot or the like.

Further, the image visual field includes a part of the real space. Further, the image visual field includes a range of a subject in imaging of an imaging device. Therefore, it is possible to supply the user with a dynamic viewpoint change in a movement exceeding a movable range of the head of the user in the real space.

<3-3. Modification Example>

The second embodiment of the present disclosure has been described above. Moreover, the embodiment is not limited to the above-described example. Hereinafter, a modification example of the embodiment will be described.

Figure 12A:
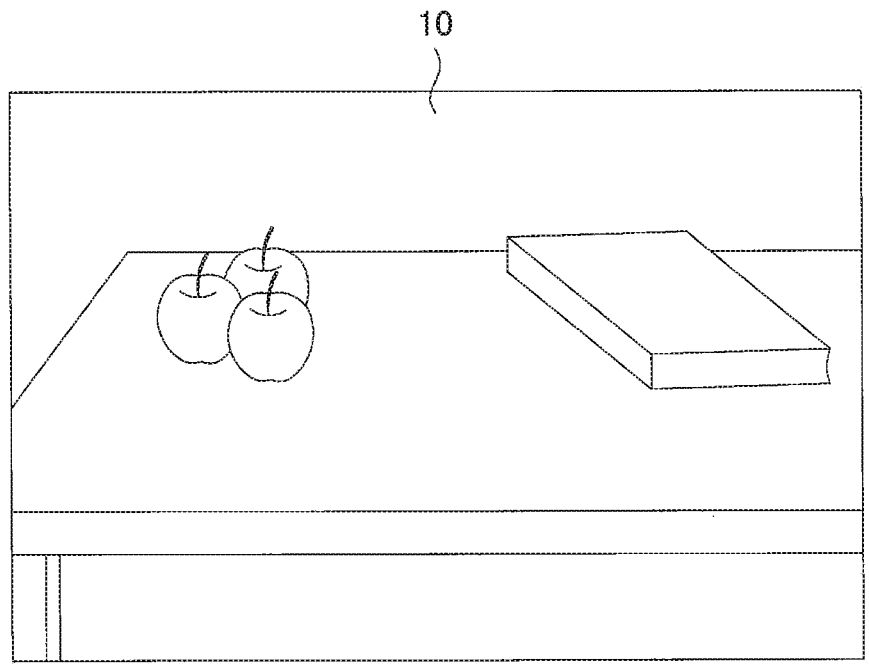
FIG. 12A is a diagram illustrating an example of an image generated based on an image visual field of an operation device displayed on a control device according to a modification example of the embodiment.
Figure 12B:
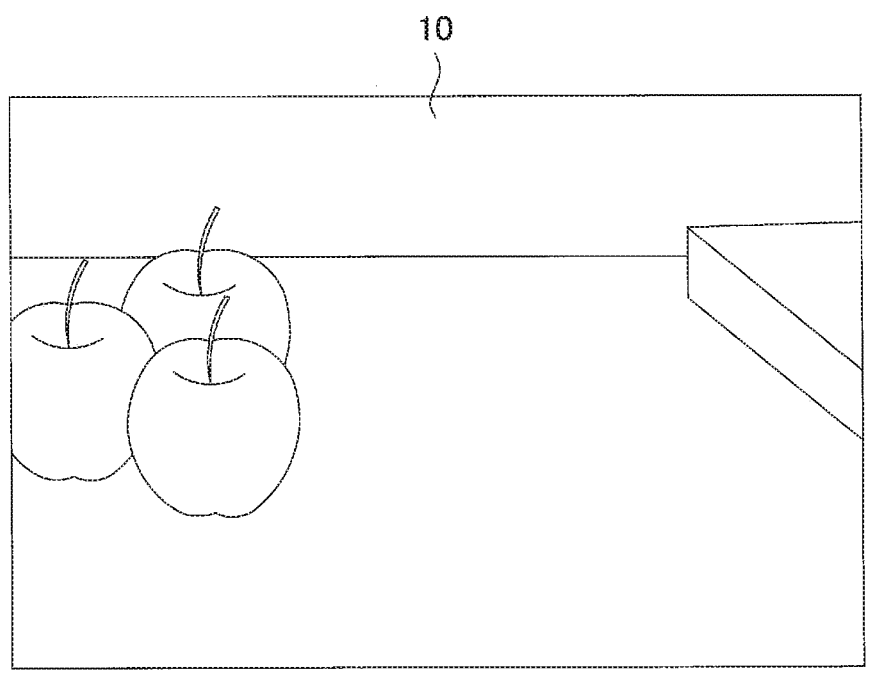
FIG. 12B is a diagram illustrating another example of the image generated based on the image visual field of the operation device displayed on the control device according to a modification example of the embodiment.

In the modification example of the embodiment, the control device 100-2 may control the broadness of the image visual field of the operation device 300. Specifically, the operation control unit 112 controls the broadness of the image visual field of the operation device 300 according to a manipulation amount of a user manipulation. Furthermore, a process according to the modification example will be described in detail with reference to FIGS. 12A and 12B. FIGS. 12A and 12B are diagrams illustrating examples of images generated based on the image visual field of the operation device 300 displayed by the control device 100-2 according to the modification example of the embodiment.

The operation control unit 112 changes the broadness of the image visual field of the operation device 300 according to a manipulation amount of the manipulation object 200-2. Specifically, the operation control unit 112 causes the control unit 304 to change an angle of view of the imaging unit 308 included the operation device 300 according to a change amount of a position attitude indicated by the received position attitude information regarding the manipulation object 200-2. For example, the operation control unit 112 causes the control unit 304 to broaden an angle of view of the imaging unit 308 with an increase in the change amount of the position attitude indicated by the position attitude information and receives an image illustrated in FIG. 12A. Further, the operation control unit 112 causes the control unit 304 to narrow the angle of view of the imaging unit 308 with a decrease in the change amount of the position attitude and receives an image illustrated in FIG. 12B.

In this way, according to the modification example of the embodiment, the display control unit 108 controls the broadness of the image visual field of the operation device 300 according to a manipulation amount of a user manipulation. Therefore, by estimating fineness of a manipulation and controlling the broadness of an image visual field, it is possible to supply the user with display appropriate for the manipulation. Thus, it is possible to improve convenience for the user.

Moreover, the process according to the modification example can also be applied to the first embodiment. Specifically, the display control unit 108 controls the broadness of the image visual field of the operation device 300 according to a manipulation amount of a user manipulation. For example, the display control unit 108 changes an angle of view of a virtual camera according to the change amount of the position attitude indicated by the received position attitude information regarding the manipulation object 200-2.

Furthermore, the display control unit 108 may change the broadness of the image visual field according to the size of the manipulation object 200-1 in the first embodiment. Specifically, the communication unit 102 receives information related to the size of the manipulation object 200-1 from the manipulation object 200-1, and the display control unit 108 changes an angle of view of a virtual camera according to the received size of the manipulation object 200-1. In this case, the user can sense the size of the body of the manipulation object 200-1, and thus it is possible to improve a sense of immersion in display.

<4. Third Embodiment (Example of Display Using Image Visual Field of Manipulation Object)>

The control device 100-2 according to the second embodiment of the present disclosure has been described above. Next, a control device 100-3 according to a third embodiment of the present disclosure will be described. The control device 100-3 superimposes an image generated based on an image visual field of a manipulation object 200-3 on an image obtained from the manipulation object 200-3.

<4-1. Configuration of Control Device>

Figure 13:
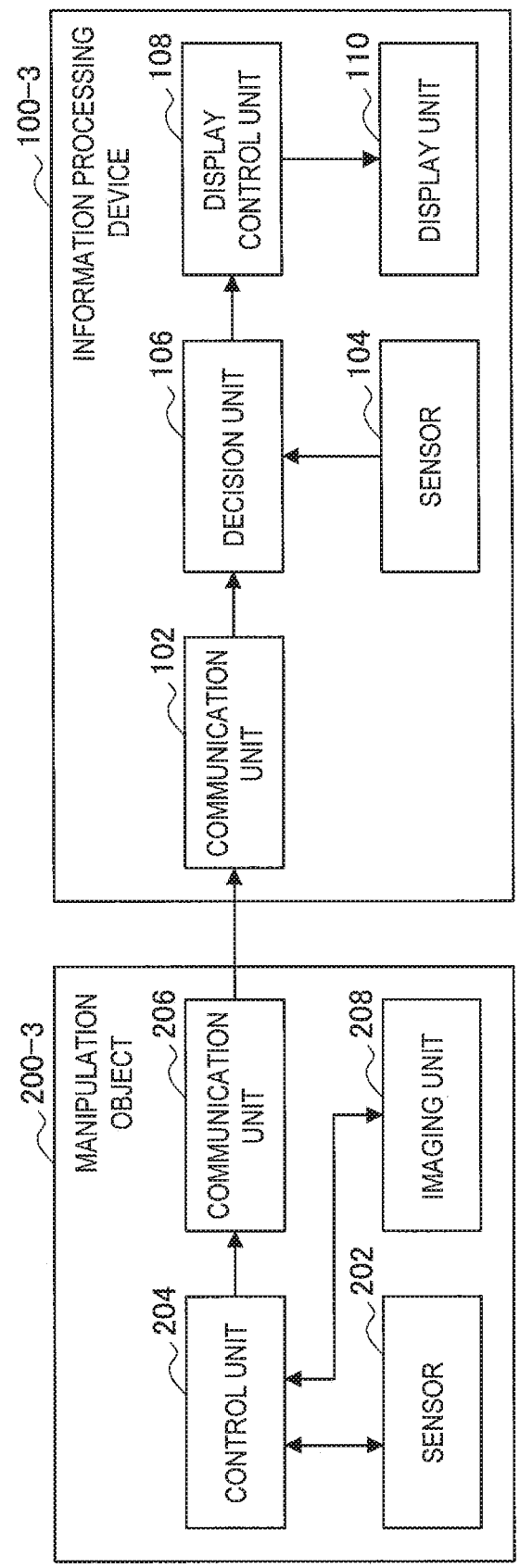
FIG. 13 is a block diagram illustrating a schematic functional configuration of a control system configured using a control device according to a third embodiment of the present disclosure.

First, the configuration of the control device 100-3 and a control system according to the third embodiment of the present disclosure will be described with reference to FIG. 13. FIG. 13 is a block diagram illustrating a schematic functional configuration of the control system configured using the control device 100-3 according to the third embodiment of the present disclosure. Moreover, the description of substantially the same functions as the functions according to the first and second embodiments will be omitted.

(Functional Configuration of Manipulation Object 200-3)

As illustrated in FIG. 13, the manipulation object 200-3 includes an imaging unit 208 in addition to the sensor 202, the control unit 204, and the communication unit 206.

The control unit 204 controls an operation of the imaging unit 208. Specifically, the control unit 204 transitions the imaging unit 208 to an imaging state or transitions the imaging unit 208 from the imaging state to an original state in response to an operation instruction. The control unit 204 causes the communication unit 206 to transmit an image obtained through imaging by the imaging unit 208 to the control device 100-3.

The communication unit 206 transmits an image obtained through the imaging by the imaging unit 208 to the control device 100-3 in addition to position attitude information.

The imaging unit 208 images the periphery of the manipulation object 200-3. Specifically, the function of the imaging unit 208 is substantially the same as the function of the imaging unit 308 in the second embodiment, and thus the description thereof will be omitted.

(Functional Configuration of Control Device 100-3)

The functional configuration of the control device 100-3 is substantially the same as the functional configuration in the first embodiment, but some of the functions of the communication unit 102 and the display control unit 108 are different.

The communication unit 102 receives an image from the manipulation object 200-3 in addition to the position attitude information.

The display control unit 108 superimposes the image generated based on the image visual field of the manipulation object 200-3 on the image received from the manipulation object 200-3. Specifically, the display control unit 108 generates an image generated based on the image visual field of the manipulation object 200-3 decided by the decision unit 106 and superimposes the generated image on the received image. For example, a virtual space and the real space are mapped using a general augmented reality (AR) technology or the like. For example, coordinates of the virtual space and the real space can be made to correspond to one another. Then, the display control unit 108 extracts a part of an image indicating the virtual space generated based on the image visual field of the manipulation object 200-3 decided by the decision unit 106, for example, a virtual object, from the virtual space. Then, the extracted virtual object is superimposed on the image received from the manipulation object 200-3 displaying the real space according to the portions of the mapping coordinates.

<4-2. Process of Control Device>

Figure 14:
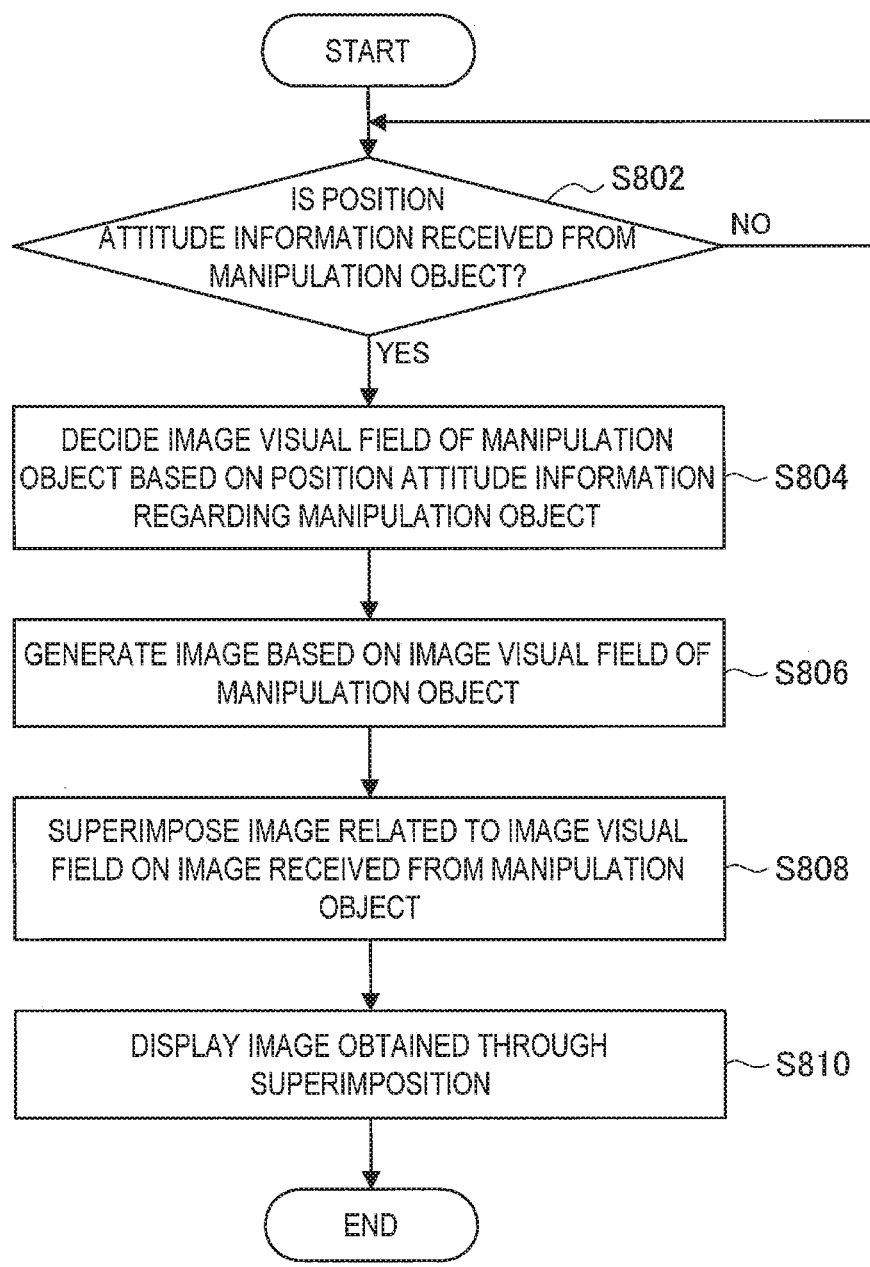
FIG. 14 is a flowchart conceptually illustrating a process of the control device according to the embodiment.

Next, a process of the control device 100-3 according to the embodiment will be described with reference to FIG. 14. FIG. 14 is a flowchart conceptually illustrating a process of the control device 100-3 according to the embodiment. Moreover, the description of substantially the same functions as the functions according to the first and second embodiments will be omitted.

First, the control device 100-3 waits until the position attitude information is received from the manipulation object 200-3 (step S802).

When the position attitude information is received from the manipulation object 200-3, the control device 100-3 decides the image visual field of the manipulation object 200-3 based on the position attitude information regarding the manipulation object 200-3 (step S804).

Next, the control device 100-3 generates an image generated based on the image visual field of the manipulation object 200-3 (step S806). Specifically, the display control unit 108 extracts a virtual object specified in the virtual space by the image visual field of the manipulation object 200-3.

Next, the control device 100-3 superimposes the image generated based on the image visual field on the image received from the manipulation object 200-3 (step S808) and displays the image obtained through the superimposition (step S810). Specifically, the display control unit 108 superimposes the extracted virtual object on the received image. Then, the display control unit 108 causes the display unit 110 to display an image obtained through the result of the superimposition.

In this way, according to the third embodiment of the present disclosure, the control device 100-3 superimposes the image generated based on the image visual field of the manipulation object 200-3 on the image obtained from the manipulation object 200-3. Therefore, by superimposing the image such as the above-described virtual object generated based on the image visual field decided according to the position attitude of the manipulation object 200-3 on the image obtained by imaging the manipulation object 200-3, it is possible to improve an information amount of the display or a sense of animation without giving a sense of discomfort to the user.

Moreover, the superimposed virtual object may be changed based on the position attitude information regarding the manipulation object 200-3. For example, the display control unit 108 changes the display position, color, shape, or the like of display of the virtual object according to the position attitude of the manipulation object 200-1 changed because of a gesture of the manipulation object 200-1, for example, a nodding operation, an inclining operation, a jump, or the like, or changes the displayed virtual object to another virtual object.

Further, the superimposed virtual object may be separately generated based on an image received from the manipulation object 200-3. For example, the display control unit 108 specifies an object depicted in the received image using an image recognition technology or the like and generates a display object related to the specified object. Then, the display control unit 108 superimposes the generated display object on the image. Moreover, the display object may be acquired from an external device.

<4-3. Modification Example>

The third embodiment of the embodiment has been described above. Moreover, the embodiment is not limited to the above-described example. Hereinafter, a modification example of the embodiment will be described.

Figure 15:
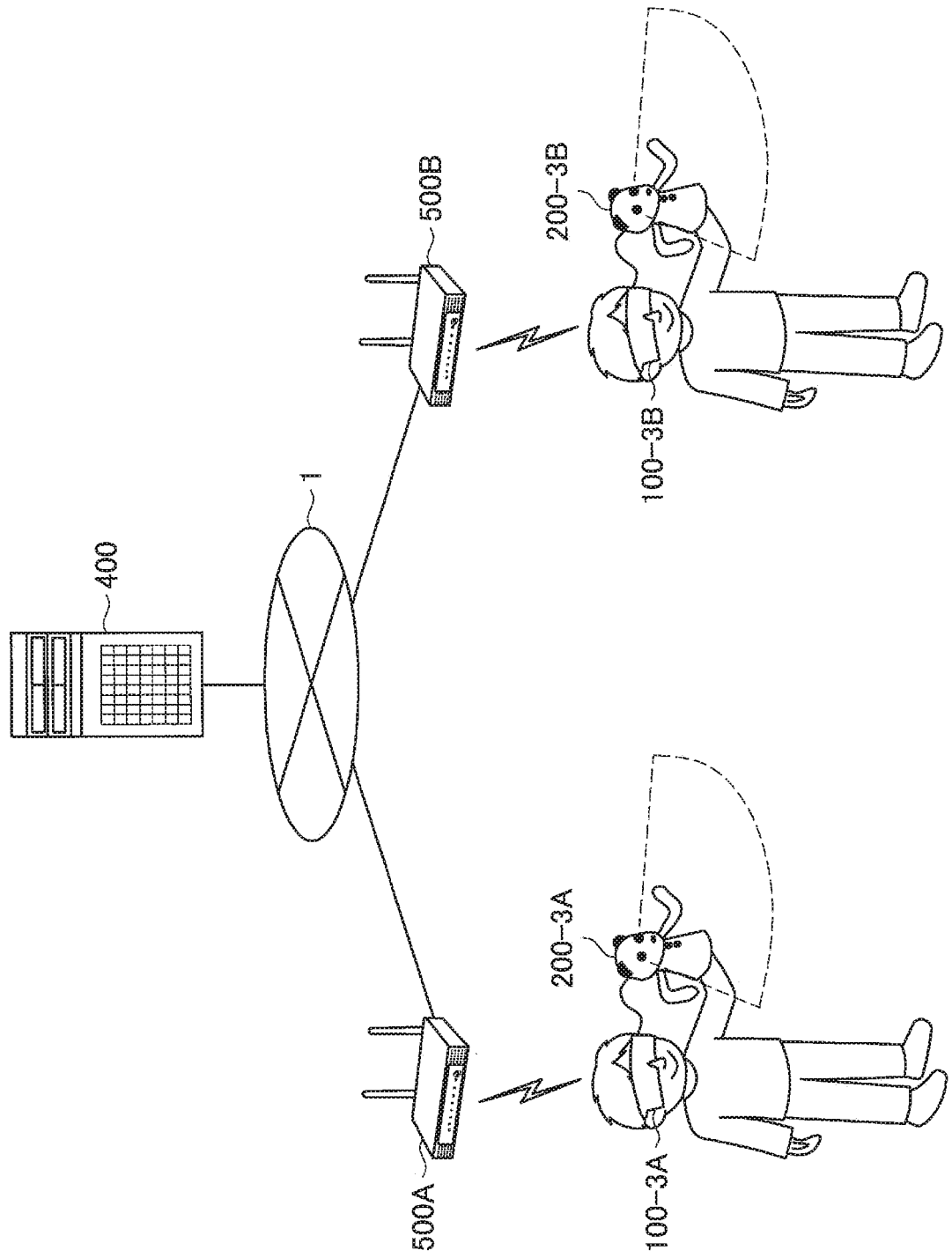
FIG. 15 is a diagram illustrating an example of the configuration of a control system using a control device according to a second modification example of the embodiment.

In the modification example of the embodiment, the control device 100-3 may perform control such that a correspondence object related to a user of another control device 100-3 (hereinafter also referred to as another user) different from the user of the control device is displayed in an image generated based on an image visual field of the manipulation object 200-3. Specifically, the display control unit 108 superimposes the correspondence object related to another user depicted in an image received from the manipulation object 200-3 on the image. Furthermore, the modification example will be described in detail with reference to FIG. 15. FIG. 15 is a diagram illustrating an example of the configuration of a control system using control devices 100-3 according to the second modification example of the embodiment.

For example, the control system according to the modification example can be configured to include the control devices 100-3, a server 400, and a wireless router 500, as illustrated in FIG. 15.

First, the control devices 100-3 transmit position attitude information regarding manipulation objects 200-3 to the server 400 through communication. For example, when position attitude information is received from the manipulation object 200-3A, the communication unit 102 of a control device 100-3A illustrated in FIG. 15 transmits the position attitude information to the server 400 via the wireless router 500A and the network 1.

The server 400 performs transmission, reception, and management of the position attitude information. For example, the server 400 causes a storage unit to store the position attitude information received from each of the control devices 100-3. Then, periodically or at the time of receiving a request from the control device 100-3, the position attitude information regarding the control device 100-3 other than the control device 100-3 of a transmission destination is transmitted to each of the control devices 100-3. For example, the server 400 can transmit the position attitude information regarding the control device 100-3A to the control device 100-3B. The position attitude information can be information regarding the same space coordinate system.

When position attitude information regarding another control device 100-3 is received, the control device 100-3 generates a correspondence object indicating another user of the other control device 100-3 based on the position attitude information. For example, the display control unit 108 generates a correspondence object indicating another user at a position on the virtual space corresponding to a position indicated by the received position attitude information, for example, a human-like object. Moreover, the correspondence object is not limited to the object indicating the user, but may be an object related to a user manipulation, for example, an object which is a manipulated and personalized doll. Further, the correspondence object may differ for each user.

Then, the control device 100-3 superimposes the correspondence object on an image received from the manipulation object 200-3 when the generated correspondence object is located within an image visual field of the manipulation object 200-3.

Moreover, FIG. 11 illustrates the example in which the server 400 is connected to each of the control devices 100-3 via the wireless router 500. However, the server 400 may be connected to each of the control devices 100-3 only in a wired manner.

In this way, according to the modification example of the embodiment, the display control unit 108 performs control such that a correspondence object related to another user is displayed in an image generated based on an image visual field of the manipulation object 200-3. Therefore, the users using the control devices 100-3 can have an understanding at a glance, and thus it is possible to facilitate communication between the users.

Moreover, the process according to the modification example can also be applied to the first embodiment. For example, the display control unit 108 displays a correspondence object related to another user in an image generated based on an image visual field of the manipulation object 200-1.

Furthermore, the display control unit 108 may also perform control such that a correspondence object related to another user is displayed in an image generated based on an image visual field of a user in the first embodiment.

<5. Hardware Configuration of Control Device According to Embodiment of Present Disclosure>

Embodiments of the present disclosure are described above. The processing of the control device 100 described above is implemented by cooperation between software and hardware of the control device 100 described below.

FIG. 16 is a diagram for describing the hardware configuration of the control device 100 according to an embodiment of the present disclosure. As illustrated in FIG. 15, the control device 100 contains a central processing unit (CPU) 132, a read only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing unit and a control unit and cooperates with various programs to thereby realize the operations of the decision unit 106, the display control unit 108, the operation control unit 112, the determination unit, and the detection unit in the control device 100. The CPU 132 may be a microprocessor. The ROM 134 stores programs, operation parameters, or the like to be used by the CPU 132. The RAM 136 temporarily stores programs for use in the execution of the CPU 132, parameters which change as appropriate in the execution, and the like. By the ROM 134 and the RAM 136, a part of the storage unit in the control device 100 is realized. The CPU 132, the ROM 134, and the RAM 136 are connected to each other through an internal bus constituted by a CPU bus and the like.

The input device 144 is constituted by an input unit which allows the user to input information, such as a mouse, a keyboard, a touch panel, a button, a microphone, a switch, and a lever, an input control circuit which generates an input signal based on an input by the user, and then outputs the signal to the CPU 132, and the like. The user of the control device 100 can operate the input device 144 to input various data to the control device 100 or instruct the control device 100 to perform a processing operation.

The output device 146 is an example of the display unit 110 of the control device 100, and performs an output operation to a device, such as a liquid crystal display (LCD), an organic light emitting diode (OLED), and a lamp. Furthermore, the output device 146 may include a loudspeaker and a headphone for outputting sound.

The storage device 148 is a device for data storage. The storage device 148 may include a storage medium, a recording device for recording data in the storage medium, a reading device for reading the data from the storage medium, and a deleting device for deleting data recorded in the storage medium. The storage device 148 stores a program executed by the CPU 132 and various types of data.

The drive 150 is a reader-writer for a storage medium and is built in or externally attached to the control device 100. The drive 150 reads out information stored on a removable storage medium that is attached thereto, such as a magnetic disk, an optical disk, a magneto-optical disk, or a semiconductor memory, and then outputs the information to the RAM 134. The drive 150 is also able to write information to a removable storage medium.

The connection port 152 is a bus for connection with a control device or peripheral devices provided outside the control device 100. The connection port 152 may be universal serial bus (USB).

The communication device 154 is a communication interface constituted by a communication device for connection with a network as an example of the communication unit 102 of the control device 100. The communication device 154 may be an infrared communication compatible device, a wireless local area network (LAN) compatible communication device, a long-term evolution (LTE) compatible communication device, or a wired communication device that performs communication through wire.

<6. Conclusion>

As described above, according to the first embodiment of the present disclosure, by displaying the image according to the position attitude of the manipulation object or the like manipulated by the user, it is possible to control a range which is a display target of the display device according to a an intention of a user although the user does not move his or her head. Further, thus, it is possible to provide the user with a dynamic viewpoint change in a movement exceeding a movable range of the head of the user. Further, according to the second embodiment of the present disclosure, for example, it is possible to suppress a visually induced motion sickness of a user since an image generated based on a image visual field of a robot or the like does not agree with a motion of the head of the user in a manipulation on the robot or the like. Further, according to the third embodiment of the present disclosure, by superimposing the virtual object generated based on the image visual field decided according to the position attitude of the manipulation object 200-3 on the image obtained by imaging the manipulation object 200-3, it is possible to improve an information amount of the display or a sense of animation without giving a sense of discomfort to the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing embodiment, the example in which the image visual field is switched based on a situation or the like of the user has been described. However, the display control unit 108 may switch the image visual field based on an event on a virtual space. For example, the display control unit 108 can switch the image visual field to one of the image visual field of the manipulation object 200 and the image visual field of the user according to a switch of a scene.

Further, the display control unit 108 may switch the image visual field based on a movement of the user of the control device 100. For example, when a movement of the control device 100, that is, a movement of the user is detected by the sensor 104, the display control unit 108 switches the image visual field of the manipulation object 200 to the image visual field of the user.

Further, in the foregoing embodiment, the example in which the angle of view of the virtual camera in the initial visual field is the angle of view at which the image visual field is narrower than a human visual field has been described. However, the angle of view of the virtual camera in the initial visual field may be an angle of view in which the image visual field has the same broadness as a human visual field.

Further, in the foregoing embodiment, the example in which the display control unit 108 controls the broadness of the image visual field according to the manipulation amount of the user manipulation has been described. However, the display control unit 108 may change the broadness of the image visual field according to the size or kind of the manipulation object 200 manipulated by the user or each manipulation object 200.

Further, the display control unit 108 may change the broadness of the image visual field based on an event on a virtual space. For example, when an event on a virtual space is generated, the display control unit 108 changes an angle of view of the virtual camera or the imaging unit to a pre-decided angle of view corresponding to the generated event.

Further, the display control unit 108 may change the broadness of the image visual field according to a position attitude of the manipulation object 200 or the like. For example, when the manipulation object 200 is oriented downward, the display control unit 108 may narrow the image visual field. When the manipulation object 200 is oriented upward, the display control unit 108 may broaden the image visual field.

Further, the display control unit 108 may control a change amount of the display according to the broadness of the image visual field. For example, the display control unit 108 can reduce, for example, a speed of change in scenery of a virtual space as the image visual field is narrowed.

Further, in the foregoing embodiments, the examples in which the control device 100 is the HMD including the display unit 110 have been described, but the control device 100 may be a control device connected to a separate display device. For example, the control device 100 may be a server that includes the communication unit 102, the decision unit 106, and the display control unit 108.

Further, the manipulation object 200 may include an output unit and the control device 100 may control an operation of the output unit of the manipulation object 200 based on an event or the like on a virtual space. For example, when an event on a virtual space is generated, the operation control unit 112 instructs the output unit of the manipulation object 200 to operate through communication as a haptics feedback on the event. Moreover, the output unit can perform, for example, voice output or vibration output.

Further, the manipulation object 200 may include an input unit and the control device 100 may include a different output unit from the display unit 110. The output unit may acquire information input to the input unit of the manipulation object 200 through communication and perform output based on the acquired information. For example, the input unit can be a sound collection sensor such as a stereo microphone and the output unit can be a speaker such as a headphone.

Further, the display control unit 108 may control a drawing speed of an image displayed by the display unit 110. For example, the display control unit 108 can control a delay time of rendering of an image received from the manipulation object 200 or the operation device 300 or an image related to a virtual space. Thus, it is possible to give an impression of slowness or weight of the image to be displayed to the user.

Further, the control device 100 according to each embodiment of the present disclosure can be applied to telepresence in which a game application, a mechanical manipulation, or a robot is employed.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A control device including: an acquisition unit configured to acquire position attitude information regarding a position or an attitude of an object related to a user manipulation located at a different position from a head of a user; and a control unit configured to control an image visual field which is a range displayed as an image on a display device mounted on the head of the user based on the position attitude information.

(2)

The control device according to (1), wherein the image visual field includes at least a part of a virtual space.

(3)

The control device according to (2), wherein the acquisition unit acquires position attitude information regarding the head of the user, and based on a situation of the user, the control unit selects one of a first image visual field specified by the position attitude information regarding the object related to the user manipulation and a second image visual field specified by the position attitude information regarding the head of the user as a range to be displayed as the image.

(4)
The control device according to (3),
wherein the control unit selects the second image visual field when a predetermined user manipulation is performed.
(5)
The control device according to (4),
wherein the control unit selects the second image visual field when the positions or the attitudes of the object related to the user manipulation and the head of the user are changed in mutually different directions.
(6)
The control device according to any one of (3) to (5), further including:
a determination unit configured to determine whether the user is in a visually induced motion sickness state,
wherein the control unit selects the second image visual field when the determination unit determines that the user is in the visually induced motion sickness state.
(7)
The control device according to (6),
wherein the determination unit determines that the user is in the visually induced motion sickness state when a displacement of the head of the user is equal to or greater than a threshold.
(8)
The control device according to (3),
wherein the control unit selects one of the first image visual field and the second image visual field based on whether the user is a manipulator of the first image visual field.
(9)
The control device according to any one of (3) to (8),
wherein the control unit performs control such that a correspondence object corresponding to the object related to the user manipulation is displayed in an image generated based on the first image visual field.
(10)
The control device according to (9),
wherein the correspondence object indicates at least a part of the object related to the user manipulation.
(11)
The control device according to (9) or (10),
wherein the correspondence object is different according to a shape or a kind of the object related to the user manipulation.
(12)
The control device according to any one of (3) to (11),
wherein the control unit controls a broadness of the first image visual field according to a manipulation amount of the user manipulation.
(13)
The control device according to any one of (3) to (12),
wherein the object related to the user manipulation includes a virtual object on a virtual space, and
the first image visual field includes an image visual field specified based on a position attitude of the virtual object.
(14)
The control device according to (13),
wherein the object related to the user manipulation includes a manipulation object, and
when a position or an attitude of only a part of the manipulation object is changed, the control unit changes a movement speed of the virtual object on the virtual space according to a change amount of the position or the attitude of the part of the manipulation object.
(15)
The control device according to (13),
wherein the control unit controls the first image visual field based on the position attitude information regarding the head of the user.
(16)
The control device according to any one of (9) to (15),
wherein the control unit performs control such that an object indicating another user different from the user is displayed in the first image visual field or the second image visual field.
(17)
The control device according to (1),
wherein the image visual field includes a part of a real space.
(18)
A control method comprising:
receiving position attitude information regarding a position or an attitude of an object related to a user manipulation located at a different position from a head of a user, and controlling an image visual field which is a range displayed as an image on a display device mounted on the head of the user based on the position attitude information.
(19)
A program causing a computer to realize:
a reception function of receiving position attitude information regarding a position or an attitude of an object related to a user manipulation located at a different position from a head of a user, and a control function of controlling an image visual field which is a range displayed as an image on a display device mounted on the head of the user based on the position attitude information.
(20)
A control system comprising:
a display device mounted on a head of a user, an acquisition unit configured to acquire position attitude information regarding a position or an attitude of an object related to a user manipulation located at a different position from the head of the user, and a control unit configured to control an image visual field which is a range displayed as an image on the display unit based on the position attitude information.

REFERENCE SIGNS LIST

100 control device
102 communication unit
104 sensor
106 decision unit
108 display control unit
110 display unit
112 operation control unit
200 manipulation object
202 sensor
204 control unit
206 communication unit
208 imaging unit
300 operation device
400 server

The invention claimed is:
1. A control device, comprising:
circuitry configured to:
acquire first position attitude information associated with a position and an attitude of a hand of a first user who operates a head-mounted display;
acquire second position attitude information associated with a position and an attitude of the head-mounted display;
determine, based on the first position attitude information and the second position attitude information, whether a first direction of the hand of the first user corresponds to a second direction of the head-mounted display;

control the head-mounted display to display a first image visual field corresponding to the hand of the first user, based on the determination that the first direction corresponds to the second direction; and control the head-mounted display to display a second image visual field corresponding to the head-mounted display, based on the determination that the first direction does not correspond to the second direction.

2. The control device according to claim 1, wherein the first image visual field includes at least a part of a virtual space.

3. The control device according to claim 1, wherein the circuitry is further configured to control the head-mounted display to display the second image visual field based on the operation of the head-mounted display.

4. The control device according to claim 1, wherein the circuitry is further configured to:
determine that a user state corresponds to a visually induced motion sickness state, and
select the second image visual field based on the determination that the user state is the visually induced motion sickness state.

5. The control device according to claim 4, wherein the circuitry is further configured to determine that the user state is the visually induced motion sickness state based on a displacement of a user head, and
wherein the displacement is one of equal to or greater than a threshold.

6. The control device according to claim 1, wherein the circuitry is further configured to control the head-mounted display to display a correspondence object, associated with the hand of the first user, in an image generated based on the first image visual field.

7. The control device according to claim 6, wherein the correspondence object indicates at least a part of the hand.

8. The control device according to claim 6, wherein one of a shape or a kind of the correspondence object is different from one of a shape or a kind of the hand.

9. The control device according to claim 6, wherein the circuitry is further configured to control the head-mounted display to display a second object that indicates a second user different from the first user in one of the first image visual field or the second image visual field.

10. The control device according to claim 1, wherein the circuitry is further configured to control a broadness of the first image visual field based on a manipulation amount of the head-mounted display.

11. The control device according to claim 1,
wherein the hand corresponds to a virtual object on a virtual space, and
wherein the first image visual field includes a third image visual field specified based on a position attitude of the virtual object.

12. The control device according to claim 11,
wherein the hand corresponds to a manipulation object, and
wherein the circuitry is further configured to change, based on an amount of change in one of a position or an attitude of at least a part of the manipulation object, a movement speed of the virtual object on the virtual space.

13. The control device according to claim 1, wherein the first image visual field includes at least a part of a real space.

14. The control device according to claim 13, wherein the first image visual field includes a second range of a subject in an image generated based on the first image visual field.

15. A control method, comprising:
acquiring first position attitude information associated with a position and an attitude of a hand of a first user who operates a head-mounted display;
acquiring second position attitude information associated with a position and an attitude of the head-mounted display;
determining, based on the first position attitude information and the second position attitude information, whether a first direction of the hand of the first user corresponds to a second direction of the head-mounted display;
controlling the head-mounted display to display a first image visual field corresponding to the hand of the first user, based on the determination that the first direction corresponds to the second direction; and
controlling the head-mounted display to display a second image visual field corresponding to the head-mounted display, based on the determination that the first direction does not correspond to the second direction.

16. A non-transitory computer-readable medium having stored thereon, computer-executable instructions that, when executed by a computer, cause the computer to execute operations, the operations comprising:
acquiring first position attitude information associated with a position and an attitude of a hand of a first user who operates a head-mounted display,
acquiring second position attitude information associated with a position and an attitude of the head-mounted display;
determining, based on the first position attitude information and the second position attitude information, whether a first direction of the hand of the first user corresponds to a second direction of the head-mounted display;
controlling the head-mounted display to display a first image visual field corresponding to the hand of the first user, based on the determination that the first direction corresponds to the second direction; and
controlling the head-mounted display to display a second image visual field corresponding to the head-mounted display, based on the determination that the first direction does not correspond to the second direction.

* * * * *